US010171317B2

(12) United States Patent
Shinohara et al.

(10) Patent No.: US 10,171,317 B2
(45) Date of Patent: Jan. 1, 2019

(54) MANAGEMENT SERVER FOR REMOTE MONITORING SYSTEM

(71) Applicant: YANMAR CO., LTD., Osaka-shi (JP)

(72) Inventors: Yoshihiko Shinohara, Osaka (JP); Hirofumi Sakamoto, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 247 days.

(21) Appl. No.: 14/357,882

(22) PCT Filed: Oct. 24, 2012

(86) PCT No.: PCT/JP2012/077429

§ 371 (c)(1),
(2) Date: May 13, 2014

(87) PCT Pub. No.: WO2013/080707

PCT Pub. Date: Jun. 6, 2013

(65) Prior Publication Data

US 2014/0310412 A1 Oct. 16, 2014

(30) Foreign Application Priority Data

Dec. 2, 2011 (JP) ................................ 2011-264965

(51) Int. Cl.
*G06F 15/173* (2006.01)
*H04L 12/26* (2006.01)
(Continued)

(52) U.S. Cl.
CPC ............ *H04L 43/04* (2013.01); *A01B 79/005* (2013.01); *B63B 49/00* (2013.01); *E02F 9/267* (2013.01);
(Continued)

(58) Field of Classification Search
CPC ........... G01S 19/05; G08G 1/20; G08G 1/205
See application file for complete search history.

(56) References Cited

U.S. PATENT DOCUMENTS 8,306,731 B2 * 11/2012 Waggaman, III ...... G06Q 10/06 340/438
9,257,034 B2 * 2/2016 Reams .................. G08C 17/02
(Continued)

FOREIGN PATENT DOCUMENTS

CN 101344993 A 1/2009
EP 1686217 A1 8/2006
(Continued)

OTHER PUBLICATIONS

Office Action dated Jul. 7, 2015 issued for corresponding Japanese Patent Application No. 2011-264965.
(Continued)

*Primary Examiner* — Michael A Keller
*Assistant Examiner* — Austin J Moreau
(74) *Attorney, Agent, or Firm* — Norton Rose Fulbright US LLP

(57) ABSTRACT

The management server causes an output section to output a startup date and time, shutdown date and time, minimum, maximum, and average values, and an occurrence count and durations of a predetermined event, for each of the operation time periods from the startup to shutdown in a unit of the remote monitoring terminal device, and causes the output section to output the startup date and time, shutdown date and time, and a movement locus of the mobile work vehicle or vessel based on the location information, for each of the operation time periods from the startup to shutdown in the unit of the remote monitoring terminal device.

7 Claims, 29 Drawing Sheets

(51) Int. Cl.

| | |
|---|---|
| ***B63B 49/00*** | (2006.01) |
| ***E02F 9/26*** | (2006.01) |
| ***G06Q 10/06*** | (2012.01) |
| ***A01B 79/00*** | (2006.01) |
| ***G07C 5/00*** | (2006.01) |
| ***G06Q 10/08*** | (2012.01) |
| ***G06Q 50/02*** | (2012.01) |
| *G07C 5/08* | (2006.01) |

(52) U.S. Cl.
CPC ......... *G06Q 10/06* (2013.01); *G06Q 10/0833* (2013.01); *G06Q 50/02* (2013.01); *G07C 5/008* (2013.01); *G07C 5/0808* (2013.01)

(56) References Cited

U.S. PATENT DOCUMENTS

| | | | | | |
|---|---|---|---|---|---|
| 2004/0198254 | A1* | 10/2004 | Mizui | G08G 1/20 | 455/99 |
| 2004/0210371 | A1* | 10/2004 | Adachi | B60R 25/00 | 701/50 |
| 2005/0145187 | A1* | 7/2005 | Gray | A01K 11/008 | 119/174 |
| 2006/0212203 | A1 | 9/2006 | Furuno | | |
| 2007/0094055 | A1* | 4/2007 | Nakayama | G06Q 10/02 | 705/5 |
| 2007/0115114 | A1* | 5/2007 | Meyers | H04B 7/145 | 340/539.13 |
| 2007/0247366 | A1* | 10/2007 | Smith | G01S 5/021 | 342/464 |
| 2008/0167733 | A1 | 7/2008 | Volant et al. | | |
| 2008/0306798 | A1* | 12/2008 | Anke | G06F 8/61 | 705/7.26 |
| 2010/0191412 | A1 | 7/2010 | Kim | | |
| 2010/0216429 | A1* | 8/2010 | Mahajan | G06F 21/6245 | 455/411 |
| 2011/0279096 | A1* | 11/2011 | Sonntag | H02J 7/34 | 320/166 |
| 2011/0282630 | A1* | 11/2011 | Rikkola | G05B 23/0232 | 702/184 |
| 2012/0157035 | A1* | 6/2012 | Hope | G01S 5/0027 | 455/404.2 |
| 2012/0262069 | A1* | 10/2012 | Reed | H05B 37/0245 | 315/130 |
| 2013/0021174 | A1* | 1/2013 | Silzer, Sr. | G05D 1/0278 | 340/989 |

FOREIGN PATENT DOCUMENTS

| | | | |
|---|---|---|---|
| JP | 2003-034953 | A | 2/2003 |
| JP | 2003-119831 | A | 4/2003 |
| JP | 2003-140743 | A | 5/2003 |
| JP | 2003-178396 | A | 6/2003 |
| JP | 2004-021286 | A | 1/2004 |
| JP | 2005-036477 | A | 2/2005 |
| JP | 2005-149310 | A | 6/2005 |
| WO | WO-2005/043481 | A1 | 5/2005 |
| WO | WO-2008/099646 | A1 | 8/2008 |

OTHER PUBLICATIONS

Supplementary European Search Report dated Sep. 16, 2014, issued for the European patent application No. 12853961.6.
International Search Report dated Jan. 15, 2013, issued for PCT/JP2012/077429.
Office Action issued in corresponding Chinese Patent Application No. CN 201280058778.7, dated May 23, 2016.

* cited by examiner

Fig.4

| Connection Terminal | Item | Output Element Qa |
|---|---|---|
| T1 | 1 | Thresh Switch |
| | 2 | Harvest Switch |
| | 3 | Auger Clutch State |
| | 4 | Engine-related Warning (Charge) |
| | 5 | Engine-related Warning (Hydraulic Pressure) |
| | 6 | Engine-related Warning (Water Temperature) |
| | 7 | Engine-related Warning (Overload) |
| | 8 | Engine-related Warning (Clogged Air Cleaner) |
| | 9 | Engine-related Warning (Clogged Rice Straw Discharger/Cutter) |
| | 10 | Engine-related Warning (Emergency Engine Shutdown) |
| | 11 | Clogged Harvest Pathway |
| | 12 | Counter Input Belt Slip |
| | 13 | Harvest Rotation Warning |
| | 14 | HST Irregularity Warning |
| | 15 | Backward Switch |
| | 16 | Low-speed-gear Harvest State |
| | 17 | High-speed-gear Harvest State |
| | 18 | High-speed-cutting Harvest State |
| | 19 | Quick Harvest State |
| | 20 | Feed-depth Sensor (L) |
| | 21 | Feed-depth Sensor (M) |
| | 22 | Feed-depth Sensor (H) |
| | 23 | Economic Mode |
| | 24 | HST Subtransmission State |
| | 25 | Feed Chain Clutch Solenoid |
| | 26 | Slow-rising Harvest Switch |
| | 27 | Slow-falling Harvest Switch |
| | 28 | Fast-rising Harvest Switch |
| | 29 | Fast-falling Harvest Switch |
| | 30 | Autolift switch |
| | 31 | Autosetting switch |
| | 32 | Quick Harvest Pedal |

| Connection Terminal | Item | Output Element Qb |
|---|---|---|
| T2 | 1 | Idling Engine Rotation |
| | 2 | Working Engine Rotation |
| | 3 | Idling Engine Load Ratio |
| | 4 | Working Engine Load Ratio |
| | 5 | Idling Vehicle Speed |
| | 6 | Working Vehicle Speed |
| | 7 | Idling Swing Motor Rotation |
| | 8 | Working Swing Motor Rotation |
| | 9 | Calculated Harvest Output Rotation Value |
| | 10 | Harvest Height Data |
| | 11 | Secondary Rotation |
| | 12 | Threshing Chamber Rotation |
| | 13 | Processing Chamber Rotation |
| | 14 | Vehicle Height Data (Right) |
| | 15 | Vehicle Height Data (Left) |
| | 16 | Incline Sensor |
| | 17 | Screening Flow Rate |
| | 18 | Amount of Remaining Fuel |
| | 19 | Harvest Position Sensor |
| | 20 | Battery Voltage |

| Connection Terminal | Item | Output Element Qc |
|---|---|---|
| T3 | 1 | Integrated Time |
| | 2 | |
| | 3 | |
| | 4 | |

| Connection Terminal | Item | Output Element Qd |
|---|---|---|
| T4 | 1 | Error Information 1 |
| | 2 | Error Information 2 |
| | 3 | Error Information 3 |
| | 4 | Error Information 4 |

| Connection Terminal | Item | Output Element Qe |
|---|---|---|
| T5 | 1 | Switch 1 |
| | 2 | Switch 2 |
| | 3 | Switch 3 |
| | 4 | Switch 4 |
| | 5 | Switch 5 |
| | 6 | Switch 6 |
| | 7 | Switch 7 |
| | 8 | Switch 8 |

| Connection Terminal | Item | Output Element Qf |
|---|---|---|
| T6 | 1 | Battery Voltage |
| | 2 | Board Temperature |

(Startup Information Transmitting Function)

| Information | Date & Time (GMT) | Location Information | |
|---|---|---|---|
| | | Latitude | Longitude |
| Startup | 2011/6/21 21:24:39 | N043426133 | E141568373 |
| 00:00:30 | 2011/6/21 21:25:09 | ...... | ...... |
| 00:01:00 | 2011/6/21 21:25:39 | ...... | ...... |
| 00:01:30 | 2011/6/21 21:26:09 | ...... | ...... |
| δ → 00:01:39 | 2011/6/21 21:26:18 | ...... | ...... |
| 00:02:00 | 2011/6/21 21:26:39 | ...... | ...... |
| 00:02:30 | 2011/6/21 21:27:09 | ...... | ...... |
| ⋮ | ⋮ | ⋮ | ⋮ |
| Shutdown | 2011/6/22 02:22:09 | N043426387 | E141567884 |

Fig.9 (Exemplary Operation in First Storage Control Arrangement)
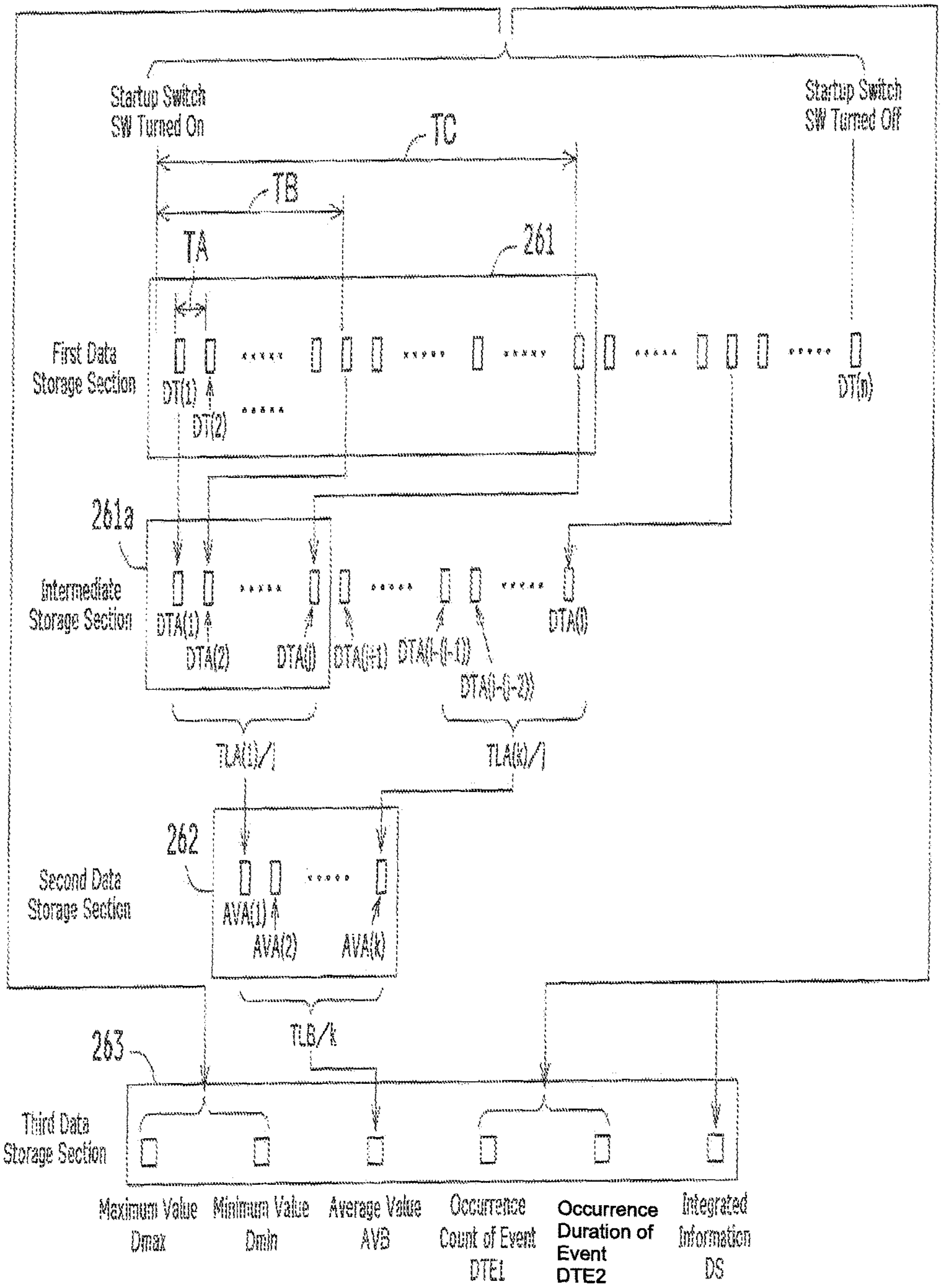

Fig.10 (Exemplary Operation in Second Storage Control Arrangement)
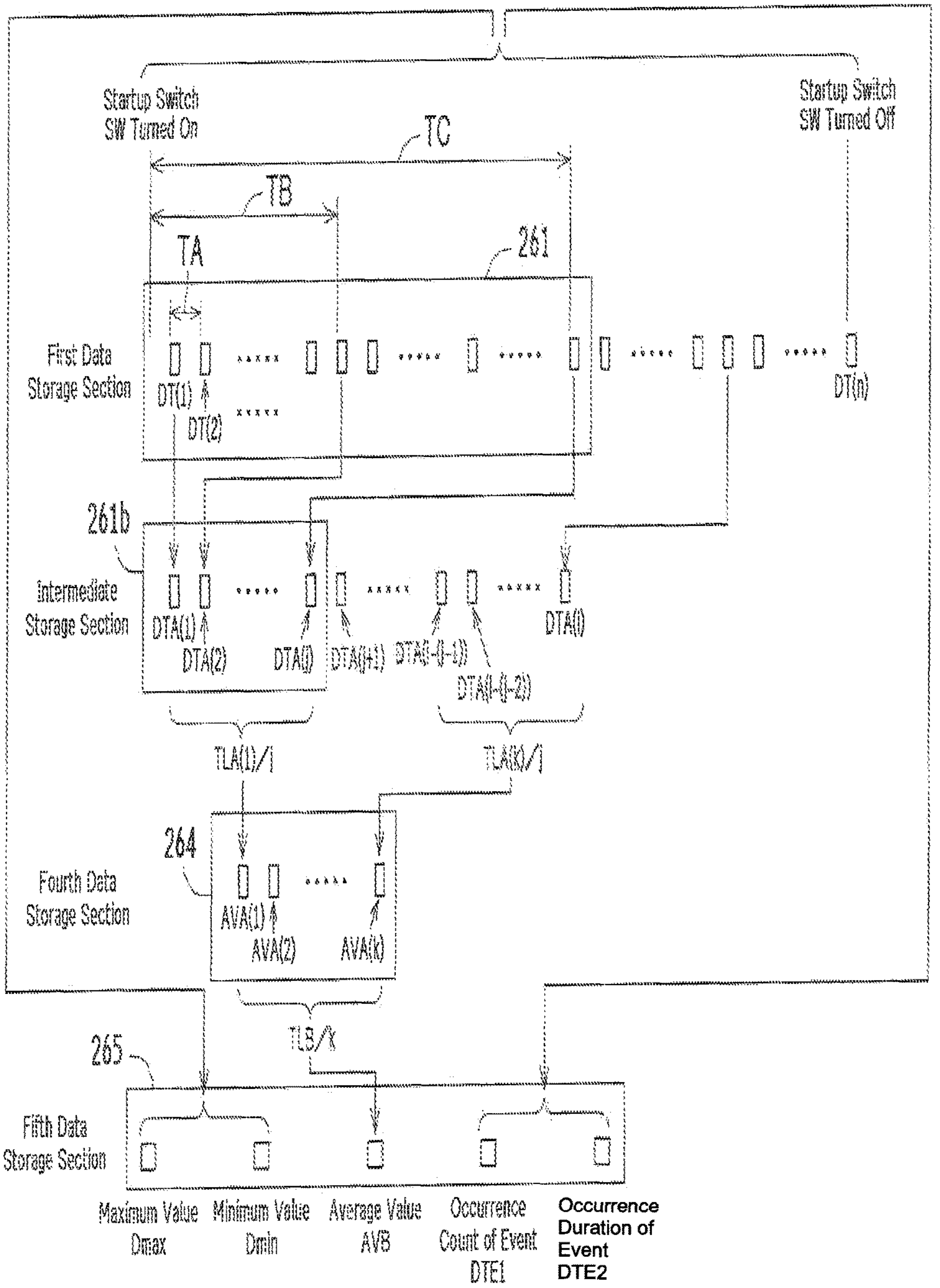

Fig.11

(Third Data Storage Section Used in First Storage Control Arrangement ) 263

| Binary Information | Occurrence of Event | |
|---|---|---|
| | Turn-on Count | Turn-on Duration (s) |
| Thresh Switch | 4 | 5757 |
| Harvest Switch | 5 | 5733 |
| Auger Clutch State | 9 | 680 |
| Engine-related Warning (Charge) | 1 | 0 |
| Engine-related Warning (Hydraulic Pressure) | 1 | 1 |
| Engine-related Warning (Water Temperature) | 0 | 0 |
| Engine-related Warning (Overload) | 6 | 3 |
| Engine-related Warning (Clogged Air Cleaner) | 0 | 0 |
| Engine-related Warning (Clogged Rice Straw Discharger/Cutter) | 0 | 0 |
| Engine-related Warning (Emergency Engine Shutdown) | 0 | 0 |
| ... | ... | ... |

| Detected Value Information | Average | Maximum | Minimum |
|---|---|---|---|
| Engine Rotation | 1478 | 2671 | 224 |
| Engine Load Ratio | 13 | 96 | 0 |
| Vehicle Speed | 0.11 | 1.83 | 0 |
| ... | ... | ... | ... |

| Integrated Information | Upon Startup | Upon Shutdown |
|---|---|---|
| Integrated Time | 150 | 153 |
| ... | ... | ... |
| ... | ... | ... |
| ... | ... | ... |

(Fifth Data Storage Section Used in Second Storage Control Arrangement) 265

| Detected Value Information | Average | Maximum | Minimum |
|---|---|---|---|
| Working Engine Rotation | 2591 | 2721 | 2102 |
| Working Engine Load Ratio | 57.5 | 100 | 0 |
| Working Vehicle Speed | 1.11 | 3.15 | 0 |
| ... | ... | ... | ... |

(Location Information Transmission Control)

| Owner ID | Contract Start Date (yyyy/mm/dd) | Contract End Date (yyyy/mm/dd) | Model | Machine Number | Terminal Telephone Number |
|---|---|---|---|---|---|
| AAAAAA | 2011/04/28 | 2011/10/28 | EFXXXX | 030127 | 080XXXXXXXX |
| BBBBBB | 2011/05/01 | 2011/11/01 | GHXXXX | 141516 | 080△△△△△△△△ |
| ⋮ | ⋮ | ⋮ | ⋮ | ⋮ | ⋮ |

| Owner ID | Owner Name/ Company Name | Group Name | Maintenance Personnel |
|---|---|---|---|
| AAAAAA | ○○○○ CO., LTD | △△ Office | □□□□ |
| BBBBBB | □□□□ CO., LTD | ◎◎ Branch | □□□□ |
| ⋮ | ⋮ | ⋮ | ⋮ |

| Model | Category | Goods Classification | Series Name |
|---|---|---|---|
| EFXXXX | Agricultural Machine | Combine Harvester | ○○○/××× |
| ⋮ | ⋮ | ⋮ | ⋮ |

| Terminal Telephone Number | Date & Time (GMT+09:00:00) | | | |
|---|---|---|---|---|
| | Startup Date (yyyy/mm/dd) | Operation Time Period Number | Startup Date & Time (yyyy/mm/dd) (hh/mm/ss) | Shutdown Date & Time (yyyy/mm/dd) (hh/mm/ss) |
| 080XXXXXXXX | 2011/06/22 | 1 | 2011/06/22 06:24:39 | 2011/06/22 11:22:09 |
| 080XXXXXXXX | 2011/06/22 | 2 | 2011/06/22 11:30:51 | 2011/06/22 11:59:44 |
| 080XXXXXXXX | 2011/06/22 | 3 | 2011/06/22 17:19:53 | 2011/06/22 20:20:43 |
| 080XXXXXXXX | 2011/06/24 | 4 | 2011/06/24 22:59:10 | 2011/06/24 23:58:30 |
| 080XXXXXXXX | 2011/06/25 | 5 | 2011/06/25 00:00:20 | 2011/06/25 01:30:25 |
| 080XXXXXXXX | 2011/06/25 | 6 | 2011/06/25 08:30:35 | 2011/06/25 09:25:20 |
| 080ΔΔΔΔΔΔΔΔ | ...... | ...... | ...... | ...... |
| ⋮ | ⋮ | ⋮ | ⋮ | ⋮ |

| Terminal Telephone Number | Operation Time Period Number | Detected Value Information | Average Value | Maximum Value | Minimum Value |
|---|---|---|---|---|---|
| 080XXXXXXXX | 1 | Engine Rotation | 1478 | 2671 | 224 |
| 080XXXXXXXX | 1 | Working Engine Rotation | 2591 | 2721 | 2102 |
| 080XXXXXXXX | 1 | Engine Load Ratio | 13 | 96 | 0 |
| 080XXXXXXXX | 1 | Working Engine Load Ratio | 57.5 | 100 | 0 |
| 080XXXXXXXX | 1 | Vehicle Speed | 0.11 | 1.83 | 0 |
| 080XXXXXXXX | 1 | Working Vehicle Speed | 1.11 | 3.15 | 0 |
| ⋮ | ⋮ | ⋮ | ⋮ | ⋮ | ⋮ |
| 080XXXXXXXX | 2 | Engine Rotation | 1298 | ... | ... |
| 080XXXXXXXX | 2 | Working Engine Rotation | ... | ... | ... |
| ⋮ | ⋮ | ⋮ | ⋮ | ⋮ | ⋮ |

| Terminal Telephone Number | Operation Time Period Number | Binary Information | Occurrence of Event | |
|---|---|---|---|---|
| | | | Turn-on Count | Turn-on Duration [S] |
| 080XXXXXXXX | 1 | Thresh Switch | 4 | 5757 |
| 080XXXXXXXX | 1 | Harvest Switch | 5 | 5733 |
| 080XXXXXXXX | 1 | Auger Clutch State | 9 | 680 |
| 080XXXXXXXX | 1 | Engine-Related Warning (Charge) | 1 | 0 |
| 080XXXXXXXX | 1 | Engine-Related Warning (Hydraulic Pressure) | 1 | 1 |
| 080XXXXXXXX | 1 | Engine-Related Warning (Water Temperature) | 0 | 0 |
| 080XXXXXXXX | 1 | Engine-Related Warning (Overload) | 6 | 3 |
| 080XXXXXXXX | 1 | Engine-Related Warning (Clogged Air Cleaner) | 0 | 0 |
| 080XXXXXXXX | 1 | Engine-Related Warning (Clogged Rice Straw Discharger/Cutter) | 0 | 0 |
| 080XXXXXXXX | 1 | Engine-Related Warning (Emergency Engine Shutdown) | 0 | 0 |
| ⋮ | ⋮ | ⋮ | ⋮ | ⋮ |
| 080XXXXXXXX | 2 | Thresh Switch | ⋯ | ⋯ |
| 080XXXXXXXX | 2 | Harvest Switch | ⋯ | ⋯ |
| ⋮ | ⋮ | ⋮ | ⋮ | ⋮ |

| Terminal Telephone Number (138f) | Operation Time Period Number (138n) | Startup Location Information | | Shutdown Location Information | |
|---|---|---|---|---|---|
| | | Latitude (138w1) | Longitude (138w2) | Latitude (138x1) | Longitude (138x2) |
| 080XXXXXXXX | 1 | N043426133 | E141568373 | N043426387 | E141567884 |
| 080XXXXXXXX | 2 | ... | ... | ... | ... |
| 080XXXXXXXX | 3 | ... | ... | ... | ... |
| 080XXXXXXXX | 4 | ... | ... | ... | ... |
| 080XXXXXXXX | 5 | ... | ... | ... | ... |
| 080XXXXXXXX | 6 | ... | ... | ... | ... |
| 080ΔΔΔΔΔΔΔΔ | 1 | ... | ... | ... | ... |
| ⋮ | ⋮ | ⋮ | ⋮ | ⋮ | ⋮ |

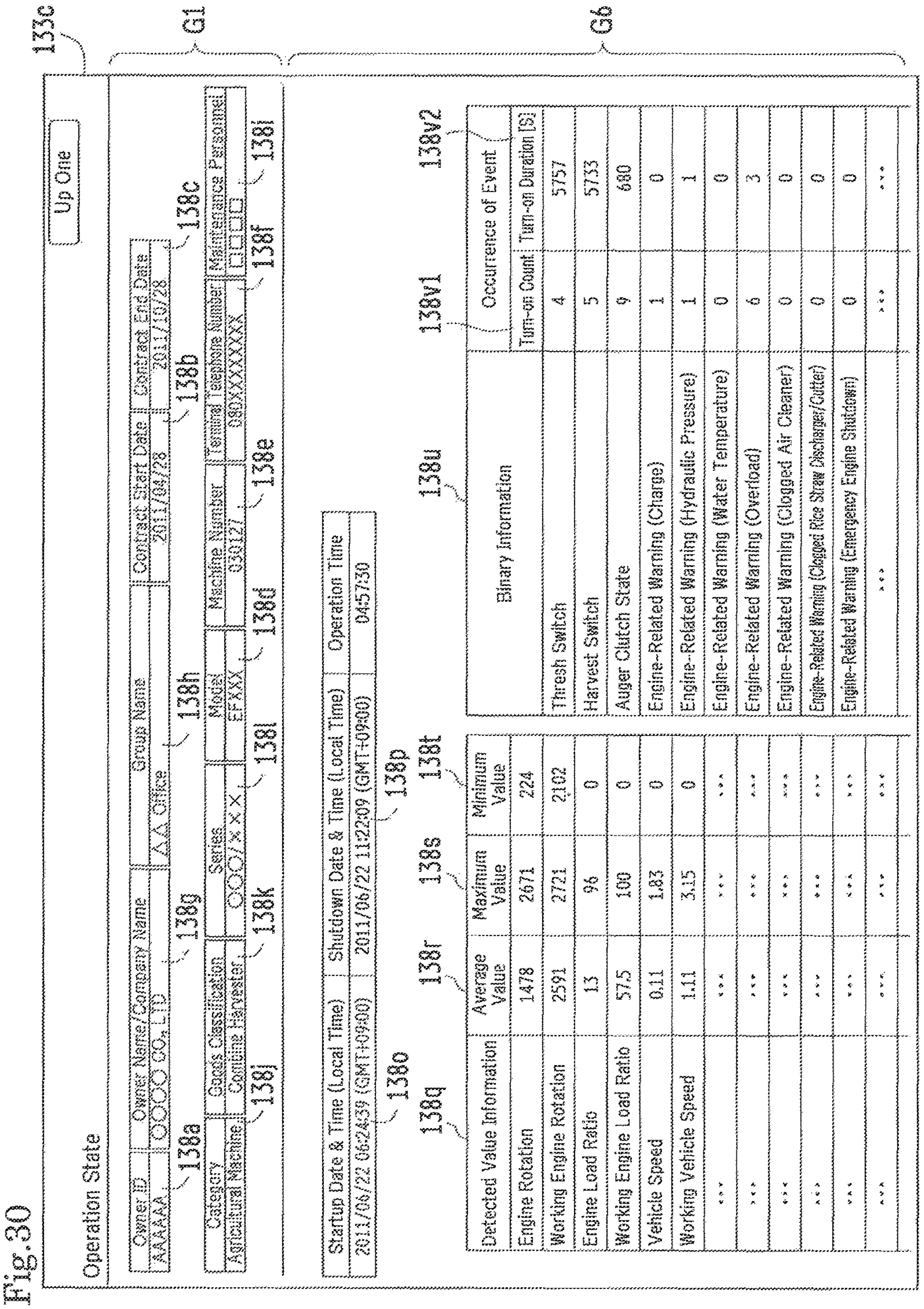

Fig. 30

| Operation State | | | | | | | | |
|---|---|---|---|---|---|---|---|---|
| Owner ID | Owner Name/Company Name | | Group Name | | Contract Start Date | Contract End Date | | |
| AAAAAA | ○○○○ Co., LTD | | △△ Office | | 2011/04/28 | 2011/10/28 | | |
| Category | Gross Classification | Series | | Model | Machine Number | Terminal Telephone Number | Maintenance Personnel | |
| Agricultural Machine | Combine Harvester | ○○○/×××× | | EFXXX | 930127 | 080XXXXXXX | □□□□ | |

| Startup Date & Time (Local Time) | Shutdown Date & Time (Local Time) | Operation Time |
|---|---|---|
| 2011/06/22 06:24:39 (GMT+09:30) | 2011/06/22 11:22:09 (GMT+09:30) | 0457730 |

| Detected Value Information | Average Value | Maximum Value | Minimum Value |
|---|---|---|---|
| Engine Rotation | 1478 | 2671 | 224 |
| Working Engine Rotation | 2591 | 2721 | 2102 |
| Engine Load Ratio | 13 | 96 | 0 |
| Working Engine Load Ratio | 57.5 | 100 | 0 |
| Vehicle Speed | 0.11 | 1.83 | 0 |
| Working Vehicle Speed | 1.11 | 3.15 | 0 |
| ... | ... | ... | ... |
| ... | ... | ... | ... |
| ... | ... | ... | ... |
| ... | ... | ... | ... |

| Binary Information | Occurrence of Event | |
|---|---|---|
| | Turn-on Count | Turn-on Duration [S] |
| Thresh Switch | 4 | 5757 |
| Harvest Switch | 5 | 5733 |
| Auger Clutch State | 9 | 680 |
| Engine-Related Warning (Charge) | 1 | 0 |
| Engine-Related Warning (Hydraulic Pressure) | 1 | 1 |
| Engine-Related Warning (Water Temperature) | 0 | 0 |
| Engine-Related Warning (Overload) | 6 | 3 |
| Engine-Related Warning (Clogged Air Cleaner) | 0 | 0 |
| Engine-Related Warning (Clogged Rice Straw Discharger/Cutter) | 0 | 0 |
| Engine-Related Warning (Emergency Engine Shutdown) | 0 | 0 |
| ... | ... | ... |

Up One

| Terminal Telephone Number | Operation Time Period Number | Date & Time (GMT + 09:00:00) | Location Information | |
|---|---|---|---|---|
| | | | Latitude | Longitude |
| 080XXXXXXXX | 1 | 2011/06/22 06:24:39 | N043426133 | E141568373 |
| 080XXXXXXXX | 1 | 2011/06/22 06:25:09 | .... | .... |
| 080XXXXXXXX | 1 | 2011/06/22 06:25:39 | .... | .... |
| 080XXXXXXXX | 1 | 2011/06/22 06:26:09 | .... | .... |
| 080XXXXXXXX | 1 | 2011/06/22 06:26:18 | .... | .... |
| 080XXXXXXXX | 1 | 2011/06/22 06:26:39 | .... | .... |
| 080XXXXXXXX | 1 | 2011/06/22 06:27:09 | .... | .... |
| ⋮ | ⋮ | ⋮ | ⋮ | ⋮ |
| 080XXXXXXXX | 1 | 2011/06/22 11:22:09 | N043426387 | E141567884 |
| 080XXXXXXXX | 2 | 2011/06/22 11:30:51 | .... | .... |
| 080XXXXXXXX | 2 | .... | .... | .... |
| ⋮ | ⋮ | ⋮ | ⋮ | ⋮ |
| 080ΔΔΔΔΔΔΔΔ | 1 | .... | .... | .... |
| ⋮ | ⋮ | ⋮ | ⋮ | ⋮ |

δ δ1 δ2 δ3 δ4 δ5 δ6

MANAGEMENT SERVER FOR REMOTE MONITORING SYSTEM

CROSS REFERENCE TO RELATED APPLICATIONS

This application is related to co-pending application: "MANAGEMENT SERVER FOR REMOTE MONITORING SYSTEM" filed even date herewith in the names of Yoshihiko Shinohara and Hirofumi Sakamoto as a national phase entry of PCT/JP2012/077432, which application is assigned to the assignee of the present application and is incorporated by reference herein.

TECHNICAL FIELD

The present invention relates to management server of a remote monitoring system for communication with a remote monitoring terminal device (in particular, a remote monitoring terminal device mounted on mobile work vehicles such as construction and agricultural machinery or vessels such as pleasure crafts and fishing boats).

BACKGROUND ART

Remote monitoring systems have been known which enable communications between a management server installed at a remote monitoring center and a remote monitoring terminal device mounted, for example, on a mobile work vehicle to monitor the mobile work vehicle, etc.

For example, Patent Document 1 discloses an arrangement where engine operation times or lever operation times are accumulated for each day, and the monthly portion is displayed as a list (for example, see FIG. 17 and [0122]).

CITATION LIST

Patent Literature

Patent Document 1: Japanese Unexamined Patent Application Publication 2004-021286

SUMMARY OF THE INVENTION

Problems to be Solved by the Invention

However, in the remote monitoring system described in Patent Document 1, an arrangement is not disclosed where a time for each operation time period from the startup to shutdown, and maximum, minimum, and average values of each sensor, etc. are output when start and termination of an operation of the remote monitoring system are repeated in a day. Therefore, when failure occurs in the mobile work vehicle, etc., it is difficult to identify an occurrence date and time in which the failure occurs in the mobile work vehicle, etc. and performs behavior analysis in a unit of the operation time period.

Accordingly, the present invention has an object to provide a management server of a remote monitoring system for communication with a remote monitoring terminal device mounted on a mobile work vehicle or vessel, which easily allows identification of an occurrence date and time in which failure, occurs in the mobile work vehicle or vessel, and behavior analysis in a unit of an operation time period from the startup to shutdown.

Solution to Problem

The present invention, to address the problems, provides a management server of a remote monitoring system according to the following first and second aspects.

(1) A Management Server of a Remote Monitoring System According to the First Aspect There is provided a management server of a remote monitoring system for communication with a remote monitoring terminal device mounted on a mobile work vehicle or vessel, which receives a startup date and time of the remote monitoring terminal device from the remote monitoring terminal device when the remote monitoring terminal device is started up, receives, from the remote monitoring terminal device, a shutdown date and time of the remote monitoring terminal device, and a minimum, maximum, and average values of data detected by the remote monitoring terminal device during an operation of the mobile work vehicle or vessel, and an occurrence count and durations of a predetermined event when the remote monitoring terminal device is shut down, distinguishes the received startup date and time, shutdown date and time, minimum, maximum, and average values, and occurrence count and durations of the predetermined event, by a daily report in a unit of an operation day for each operation time period from the startup to shutdown, and causes an output section to output the distinguished information in a unit of the remote monitoring terminal device.

(2) A Management Server of a Remote Monitoring System According to the Second Aspect There is a provided a management server of a remote monitoring system for communication with a remote monitoring terminal device mounted on a mobile work vehicle or vessel, which receives a startup date and time of the remote monitoring terminal device from the remote monitoring terminal device when the remote monitoring terminal device is started up, receives, from the remote monitoring terminal device, a shutdown date and time of the remote monitoring terminal device, and location information obtained for each predetermined interval defined in advance by the remote monitoring terminal device and each manual operation of a predetermined manual operation section during an operation of the mobile work vehicle or vessel when the remote monitoring terminal device is shut down, performs color-coding on the received startup date and time, shutdown date and time, and a movement locus of the mobile work vehicle or vessel based on the location information, for each operation time period from the startup to shutdown by a daily report in a unit of an operation day, and causes an output section to output the color-coded information in a unit of the remote monitoring terminal device.

As the output section in the present invention, an output section provided in the management server, and an output section provided in a terminal device (specifically, client computer) such as a personal computer, tablet computer, and mobile terminal, which is connected to the management server apart from the remote monitoring terminal device and uses data in the management server are exemplified. As the output section, typically a display section such as a display and a print section such as a printer are exemplified.

The manual operation of the predetermined manual operation section according to the second aspect of the present invention is a manual operation in which the course is changed in a short period of time (for example, rapidly) in the mobile work vehicle or vessel. As the manual operation of the predetermined manual operation section, an manual operation in which a travelling handle of the mobile work vehicle or a steering rod of the vessel corresponds to a predetermined value (specifically, predetermined rotation angle) or more.

In the management server according to the present invention, in the first aspect, the output section is caused to output the startup date and time, shutdown date and time, minimum, maximum, and average values, and occurrence count and durations of the predetermined event, for each of the operation time periods in the unit of the remote monitoring terminal device, and in the second aspect, the output section is caused to output the startup date and time, shutdown date and time, and movement locus, for each of the operation time periods in the unit of the remote monitoring terminal device, so that identification of an occurrence date and time in which failure occurs in the mobile work vehicle or vessel, and behavior analysis in the unit of the operation time period can be performed easily.

In the present invention, an aspect can be exemplified in which the startup date and time and shutdown date and time that are received from the remote monitoring terminal device correspond to the coordinated universal time, and startup location information, that is location information obtained upon a startup of the remote monitoring terminal device or shutdown location information that is location information obtained upon a shutdown of the remote monitoring terminal device is received, and the startup date and time and shutdown date and time that are received, from the remote monitoring terminal device and correspond to the coordinated universal time are converted into local date and time at a location obtained upon a startup or a location obtained upon the shutdown of the remote monitoring terminal device based on the received startup location information or shutdown location information, and the output section is caused to output the converted local date and time.

According to this feature, there is provided the arrangement in which the startup date and time and shutdown date and time that are received from the remote monitoring terminal device and correspond to the coordinated universal time are converted into the local date and time at the location obtained upon the startup or the location obtained upon the shutdown of the remote monitoring terminal device based on the startup location information or the shutdown location information, and the output section is caused to output the converted local date and time, so that identification of an occurrence date and time in which failure occurs in the mobile work vehicle or vessel, and behavior analysis in the unit of the operation time periods can be performed easily in the state according to the local time.

Advantageous Effects of the Invention

As described above, in the present invention, identification of an occurrence date and time in which failure occurs in the mobile work vehicle or vessel, and behavior analysis in the unit of the operation time periods from the startup to shutdown can be performed easily.

BRIEF DESCRIPTION OF DRAWINGS

FIG. 4 is a table showing concrete examples of output elements for various connection terminals in a case where the agricultural machine is a combine harvester.

FIG. 6 is a schematic data structure table showing exemplary data stored in a location information storage section.

FIG. 9 is a diagram illustrating an exemplary operation for a first storage control arrangement of the operation information transmission control section to determine maximum, minimum, and average values of detected value information and an occurrence count and durations of an event.

FIG. 10 is a diagram illustrating an exemplary operation for a second storage control arrangement of the operation information transmission control section to determine maximum, minimum, and average values of detected value information and an occurrence count and durations of an event.

FIG. 11 is a schematic data structure table showing exemplary data for a third data storage section for use by the first storage control arrangement of the operation information, transmission control section.

FIG. 21 is a schematic data structure table showing exemplary data stored in the storage section, and is a diagram of a first storage table provided in the storage section.

FIG. 22 is a schematic data structure table showing exemplary data stored in the storage section, and is a diagram of a second storage table provided in the storage section.

FIG. 23 is a schematic data structure table showing exemplary data stored in the storage section, and is a diagram of a third storage table provided in the storage section.

FIG. 24 is a schematic data structure table showing exemplary data stored in the storage section, and is a diagram of a fourth storage table provided in the storage section.

FIG. 25 is a schematic data structure table showing exemplary data stored in the storage section, and is a diagram of a fifth storage table provided in the storage section.

FIG. 26 is a schematic data structure table showing exemplary data stored in the storage section, and is a diagram of a sixth storage table provided in the storage section.

FIG. 27 is a schematic data structure table showing exemplary data stored in the storage section, and is a diagram of a seventh storage table provided in the storage section.

FIG. 30 is a diagram illustrating an exemplary display screen that displays operation information, and is a diagram for a third display screen.

FIG. 31 is a schematic date structure table showing exemplary data stored in the storage section, and is a diagram of an eighth storage table provided in the storage section.

DESCRIPTION OF EMBODIMENTS

The following will describe an embodiment of the present invention in reference to attached drawings by taking a combine harvester, tiller, rice transplanter, or like agricultural machinery as an example of the mobile work vehicle or vessel.

Overall Arrangement of Remote Monitoring System

Figure 1:
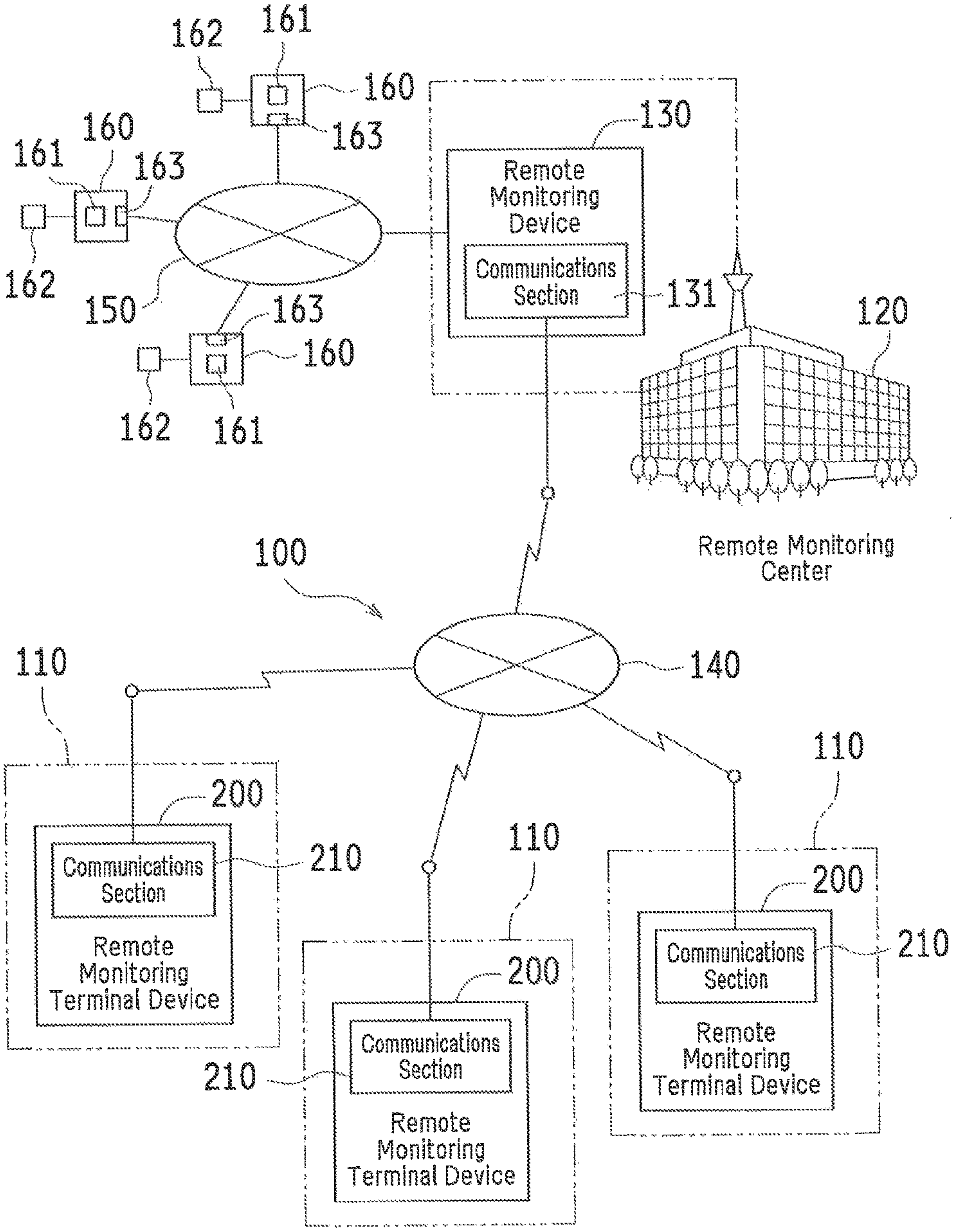
FIG. 1 is a schematic illustration of a remote monitoring system for remote monitoring of agricultural machines.
Figure 2:
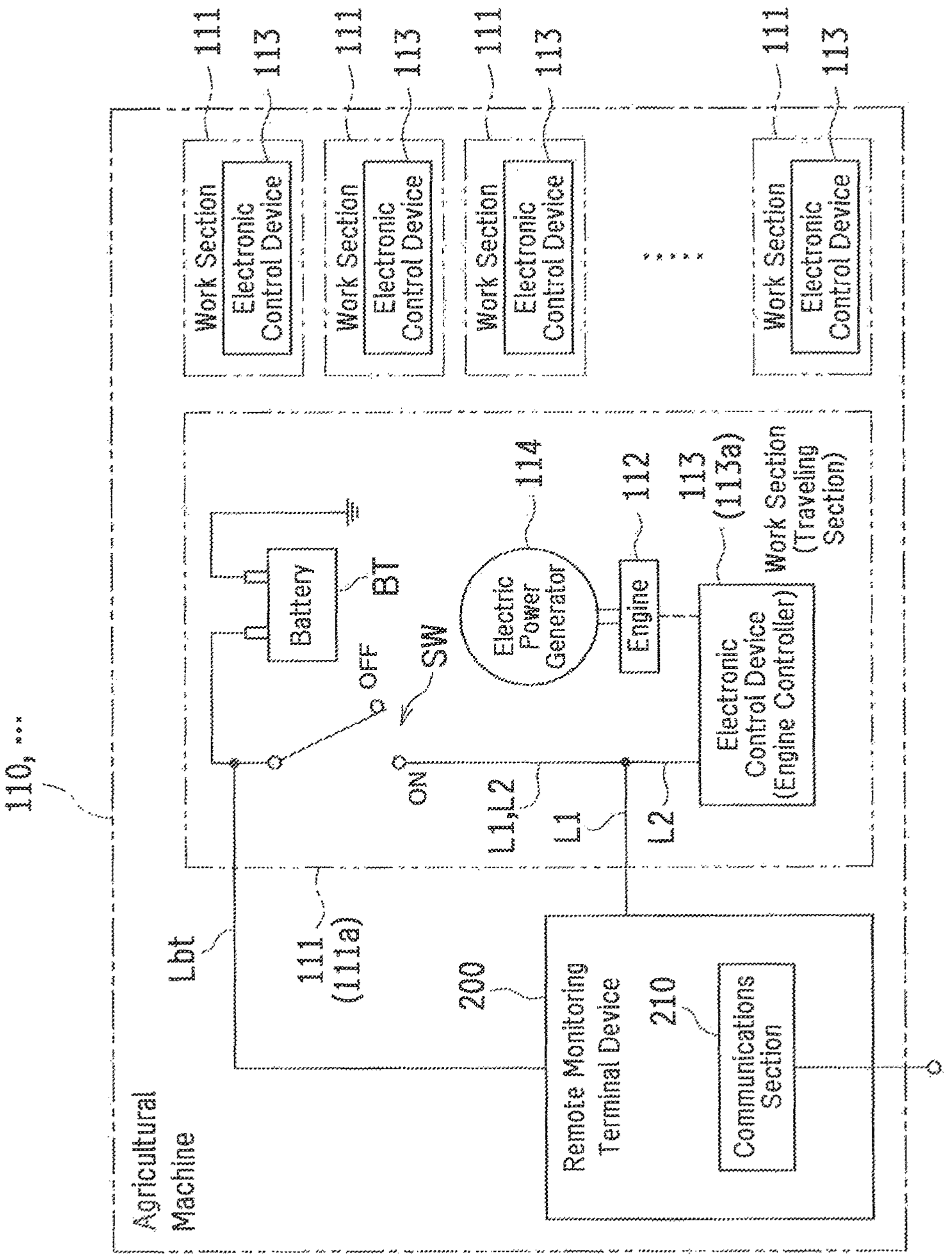
FIG. 2 is a schematic block diagram of the arrangement of an agricultural machine with a remote monitoring terminal device.
Figure 3:
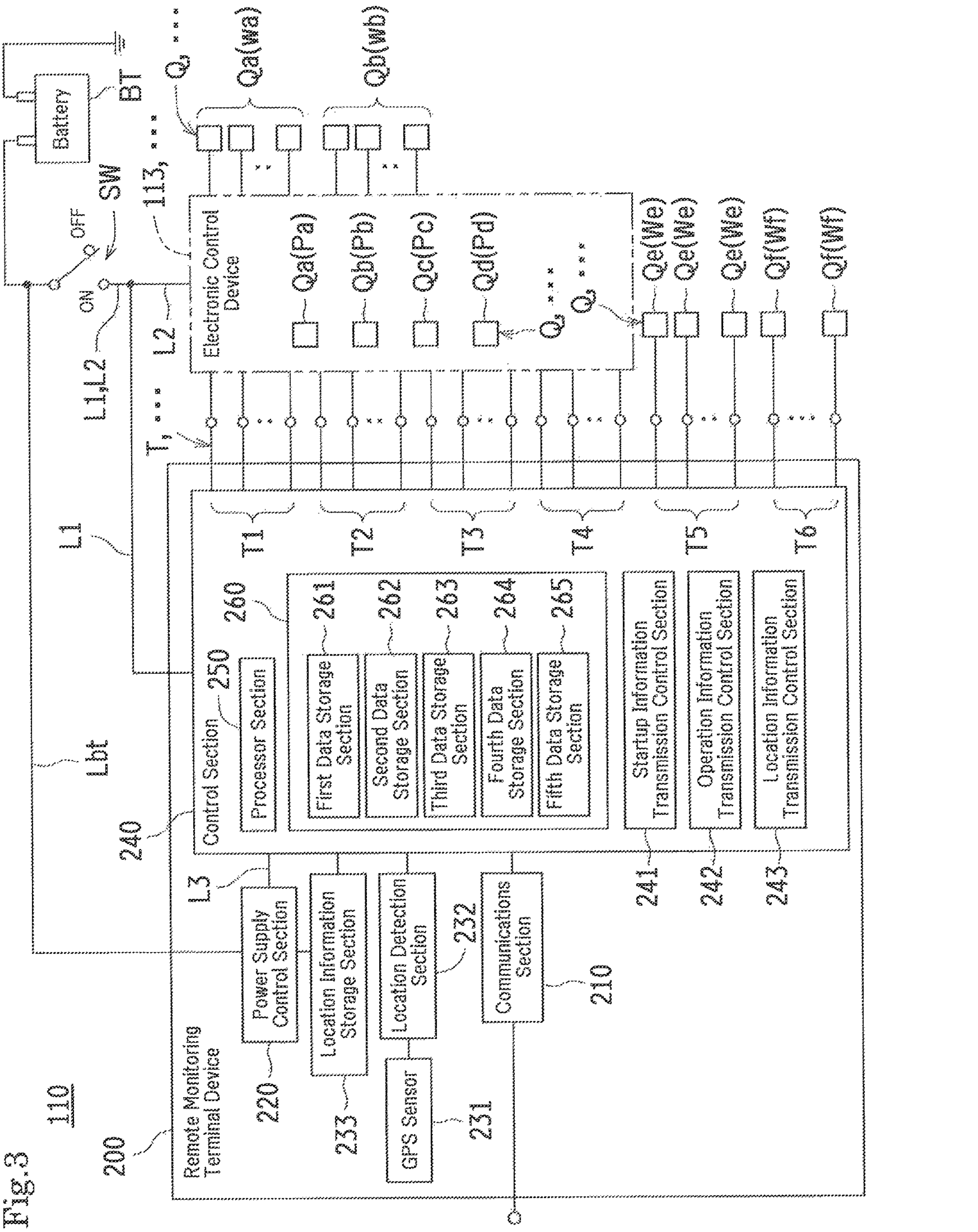
FIG. 3 is a schematic block diagram of the arrangement of a remote monitoring terminal device for an agricultural machine.

FIG. 1 is a schematic illustration of a remote monitoring system 100 for remote monitoring of agricultural machines 110. FIG. 2 is a schematic block diagram of the arrangement of an agricultural machine 110 with a remote monitoring terminal device 200. FIG. 3 is a schematic block diagram of the arrangement of a remote monitoring terminal device 200 for an agricultural machine 110.

As illustrated in FIG. 1, the remote monitoring system 100 includes at least one (in this case, two or more) agricultural machine (exemplary mobile work vehicle) 110, remote monitoring terminal devices 200, one for each agricultural machine 110, and a remote monitoring device 130 connected to the remote monitoring terminal devices 200 over a communications network 140.

The remote monitoring device 130 is installed at a remote monitoring center 120 located remotely from the agricultural machines 110 and collects and stores data on the operation states of the agricultural machines 110. The remote monitoring device 130 is connected to terminal devices 160 (e.g., personal computers, tablet computers, and mobile terminals) over a network 150 (e.g., a LAN (local area network) or the Internet). The device 130 feeds collected data to the terminal devices 160 to make the data available to users, for example, users and sales agents of the agricultural machines 110.

Specifically, each remote monitoring terminal device 200 and the remote monitoring device 130 include respectively a communications section. 210 and a communications section 131 (specifically, communications modules) and are connected to each other over the communications network 140 through the communications sections 210 and 131 to enable information exchange between the remote monitoring terminal device 200 and the remote monitoring device 130. Thus, the remote monitoring device 130 enables the user at the remote monitoring center 120 to remotely monitor the agricultural machines 110.

The communications network 140 may be a wired communications network, a wireless communications network, or a combination of a wired and wireless communications networks. The communications' network 140 is typically a public line network provided by a telecommunications carrier, for example, a public line network that enables communications between fixed-line phones, mobile phones, and like terminals.

As illustrated in FIG. 2, each agricultural machine 110 includes at least one (in this case, two or more) work section 111 and a remote monitoring terminal device 200. The work section 111 may be, for example, a traveling section, a harvesting section, or a threshing section when the agricultural machine is a combine harvester.

Each work section 111 is equipped with an electronic control device (specifically, controller) 113 which instructs various actuators (not shown) to control the operation state of the work section 111 in a suitable manner. The electronic control devices 113 are capable of mutual data transfer in compliance with the CAN (Controller Area Network) standards.

Specifically, each electronic control device 113 controls the operation state of an associated work section. 111 on the basis of detected value information (signals) detected by various sensors (detailed later) and on/off information of various switches (detailed later) in the work section 111. The electronic control device 113 evaluates, as needed, the presence/absence of irregularities, for example, whether there has occurred a breakdown/malfunction, in the agricultural machine 110. If there has occurred an irregularity, the device 113 generates error information (specifically, an error code) in accordance with the irregularity.

A work section 111 (traveling section 111*a*), or one of the work sections 111 which actuates an engine 112, includes the engine 112, an electronic control device 113 (engine controller 113*a*) an electric power generator 114, and a startup switch SW and may further include a battery BT. The electronic control device 113 (engine controller 113*a*) monitors the rotational speed, load, and other conditions of the engine 112 to instruct a fuel system on, for example, an optimal injection pressure and an injection period for the control of the entire engine. The electronic control device 113 (engine controller 113*a*) controls manual startup/suspension operations and controls an operation state through activation of the engine 112, as well as controls the operation of the work section 111 (traveling section 111*a*).

After the work section 111 (traveling section 111*a*) is started (when the engine 112 is operating), the battery BT is charged, as needed, by an electric power supply from the electric power generator 114.

The startup switch SW of the work section 111 (traveling section 111*a*) is a toggling switch selectively toggling between a power-supply-on state and a power-supply-off state. The battery BT, in the power-supply-on state, is allowed to supply electric power to a control section 240 in the remote monitoring terminal device 200 and to the electronic control device 113 (engine controller 113*a*) (see FIG. 3), whereas in the power-supply-off state, the battery BT is inhibited from supplying electric power to the control section 240 in the remote monitoring terminal device 200 and to the electronic control device 113 (engine controller 113*a*).

Specifically, the battery BT is connected both to a power supply connecting line L1 connected to the control section 240 in the remote monitoring terminal device 200 and to a power supply connecting line L2 connected to the electronic control device 113 (engine controller 113*a*) via the startup switch SW.

In this example, the startup switch SW is a "key switch." The startup switch SW has an ON terminal connected to the power supply connecting lines L1 and L2 while the engine 112 is operating and an OFF terminal used while the startup switch SW is being turned off.

As will be detailed later, the battery BT is connected to a power supply control section 220 in the remote monitoring terminal device 200 via a power supply connecting line Lbt to periodically start up power supply, no matter whether the startup switch SW is being turned on or off. Hence, the power supply control section 220 in the remote monitoring terminal device 200 is always fed with electric power from the battery BT.

Remote Monitoring Terminal Device

As illustrated in FIG. 3, the remote monitoring terminal device 200 includes a communications section 210, a power supply control section 220, a control section 240, and connection terminals T. The power supply control section 220 periodically starts up power supply while the startup switch SW of the agricultural machine 110 is being turned off. The control section 240, during communication, transmits/receives data and controls various inputs/outputs and computations. The remote monitoring terminal device 200 receives inputs of data on the operation state of the agricultural machine 110 via the connection terminals T.

Communications Section

The communications section 210 is capable of the same communications protocols as the communications section 131 in the remote monitoring device 130 at the remote monitoring center 120 so that the communications section 210 can communicate with the communications section 131. The communications section 210 converts the data to be transmitted/received during communication according to the communications protocols. The communications section 210 then transmits the data, acquired by the control section, 240, on the operation state of the agricultural machine 110 to the remote monitoring device 130.

Power Supply Control Section

The power supply control section 220 has a timer function and is connected to the battery BT, no matter whether the startup switch SW is being turned off or on. Specifically, the battery BT is connected to an incoming power supply line (not shown) for the power supply control section 220 via the power supply connecting line Lbt, so that the power supply control section 220 can be always fed with electric power from the battery BT.

An outgoing power supply line (not shown) for the power supply control section 220 is connected to a power supply line (not shown) for the control section 240 via a power supply connecting line L3.

In the remote monitoring terminal device 200, the control section 240 is periodically fed with electric power from the battery BT by virtue of the timer function of the power supply control section 220 while the startup switch SW is being turned off to inhibit electric power from being supplied to the power supply connecting line L1 which connects the battery BT to the incoming power supply line for the control section 240. This arrangement is for the purpose of reducing the power consumption of the battery BT.

Location Detection Section

In the present embodiment, the remote monitoring terminal device 200 further includes a GPS (Global Positioning System) sensor (exemplary location sensor) 231, a location detection section 232, and a location information storage section 233. The GPS sensor 231 receives radio waves from GPS satellites. The location detection section 232 detects the location information of the agricultural machine 110 in the radio waves received through the GPS sensor 231. The location information storage section 233 temporarily stores therein the location information detected by the location detection section 232.

The GPS sensor 231 receives radio waves (information containing an international standard time) from GPS satellites. The international standard time here is the UTC, or Universal Time Coordinated.

The location detection section 232 is capable of detecting, besides the location information of the agricultural machine 110, the velocity and orientation information of the agricultural machine 110. In other words, the location information contains information on the latitude, longitude, velocity, and orientation of the agricultural machine 110.

Specifically, the location detection section 232, along with the GPS sensor 231 and GPS satellites, constitutes a GPS satellite system (positioning system).

The location information storage section 233 is a volatile memory, such as a RAM (random access memory). The location information storage section 233 is connected to the power supply control section 220 so as to be always fed with electric power from the battery BT. Thus, the location information storage section 233 is capable of maintaining the location information even while the startup switch SW is being turned off.

Control Section

The control section 240 includes a processor section 250 and a storage section (exemplary data storage section) 260. The processor section 250 is composed of a CPU (central processing unit) or like microcomputer. The storage section 260 is composed primarily of a ROM (read only memory), RAM, and like volatile memory.

The control section 240 controls the operation of various components by the processor section 250 loading control programs stored in advance in the ROM in the storage section 260 to the RAM in the storage section 260 and executing them. The RAM in the storage section 260 provides first to fifth data storage sections 261 to 265.

Connection Terminals

Multiple (in this case, 70) connection terminals T serve as multiple types of connection terminals connected to output elements Q at which data on the operation state of the agricultural machine 110 is supplied externally. In the present embodiment are there provided at least one in this case, 32) first connection terminal T1, at least one (in this case, 20) second connection terminal T2, at least one (in this case, 4) third connection terminal T3, at least one (in this case, 4) fourth connection terminal T4, at least one (in this case, 8) fifth connection terminal T5, and at least one (in this case, 2) sixth connection terminal T6.

The first, second, third, and fourth connection terminals T1, T2, T3, and T4 are connected to the control section 240.

The first and second connection terminals T1 and T2 are connected to the output elements Q for the work sections 111 via the electronic control devices 113. The fifth and sixth connection terminals T5 and T6 are connected to the control section 240 and also directly to the output elements Q for the work sections 111.

The first connection terminals T1 are connected to output elements Qa at which binary information (specifically, binarized: signals) is available, to receive the binary information at the output elements Qa. The binary information is, for example, on/off information (specifically, contact point information represented by a 0 or 1) and error status information (specifically, error presence/absence information represented by a 0 or 1) indicating the presence/absence of a breakdown/malfunction or like irregularity. In this example, the binary information is transmitted in the form of CAN bit data.

The output elements Qa at which binary information is available may be composed of for example, various switches Wa which are connected to input circuitry for the electronic control devices 113 for output of on/off information on the operation state of the agricultural machine 110. Another example would be an output control section Pa in an electronic control device 113 for output of error status information indicating the presence/absence of a breakdown/malfunction or like irregularity in the work sections 111.

Specifically, if the output elements Qa are composed of various switches Wa, the first connection terminals T1 receive on/off information from the various switches Wa via the electronic control devices 113; if the output elements Qa are provided as an output control section Pa, the first connection terminals T1 receive error status information from the output control section Pa in the electronic control devices 113.

The second connection terminals T2 are connected to output elements Qb at which detected value information (specifically, multivalue digital signals) is available, to receive the detected value information at the output elements Qb. The detected value information is, for example, numeric value data indicating measured (detected) values of a predetermined set of physical quantities, error codes indicating the type of the breakdown/malfunction or like irregularity, and the voltage level of the battery BT. In this example, the detected value information is transmitted in the form of CAN numeric value data.

The output elements Qb at which detected value information is available may be composed of for example, various sensors Wb which are connected to input circuitry for the electronic control devices 113 for detection of the operation state of the agricultural machine 110. Another example would be an output control section Pb in an electronic control device 113 (engine controller 113*a*) for output of the voltage level of the battery BT.

Specifically, if the output elements Qb are composed of various sensors Wb, the second connection terminals T2 receive numeric value data from the various sensors Wb via the electronic control devices 113; if the output elements Qb are provided as an output control section Pb, the second connection terminals T2 receive the voltage level of the battery BT from the output control section Pb in the electronic control device 113 (engine controller 113*a*).

The third connection terminals T3 are connected to output elements Qc at which integrated information (e.g., an integrated time) is available, to receive the integrated information at the output elements Qc. In this example, the integrated information is transmitted in the form of CAN integrated data.

The output elements Qc at which integrated information is available may be provided as, for example, an output control section Pc in an electronic control device 113 (engine controller 113*a*) for output of an integrated, time obtained by integrating the operation times of the engine 112. An operation time is the time from a startup of the engine 112 (when the startup switch SW is turned on) to a subsequent shutdown of the engine 112 when the startup switch SW is turned off).

Specifically, if the output elements Qc are provided as an output control section Pc, the third connection terminals T3 receive the integrated time of the engine 112 from the output control section Pc in the electronic control device 113 (engine controller 113*a*).

The fourth connection terminals T4 are connected to output elements Qd at which error information according to the CAN communications protocol is available, to receive error information at the output elements Qd.

The output elements Qd at which error information is available may be provided as, for example, an output control section Pd in an electronic control device 113 for identification of an error in view of the specifications of the CAN communications protocol and for output of error information in accordance with the error.

Specifically, if the output elements Qd are provided as an output control section Pd, the fourth connection terminals T4 receive error information from the output control section Pd in the electronic control device 113.

The fifth connection terminals T5 are connected to output elements Qe at which binary information is available, to receive the binary information at the output elements Qe.

The output elements Qe at which binary information is available may be composed of, for example, various switches We provided for output of on/off information on the operation state of the agricultural machine 110.

Specifically, if the output elements Qe are composed of various switches We, the fifth connection terminals T5 receive the on/off information directly from the various switches We. The fifth connection, terminals T5 may be used when each work section 111 includes an electronic control device 113. However, the terminals T5 will be advantageously used primarily when each work section 111 does not include an electronic control device 113.

The sixth connection terminals T6 are connected to output elements Qf at which detected value information (specifically, analog signals) is available, to receive the detected value information at the output elements Qf. The detected value information is, for example, numeric value data indicating measured (detected) values of a predetermined set of physical quantities (e.g., the voltage level of the battery BT and the temperature of a board (not shown) mounted in an electronic control device 113).

The output elements Qf at which detected value information is available may be composed of, fir example, various sensors Wf for detection of the operation states of the agricultural machines 110.

Specifically, if the output elements Qf are composed of various sensors Wf, the sixth connection terminals T6 receive numeric value data directly from the various sensors Wf.

A startup information transmission control section 241, an operation information transmission control section 242 and a location information transmission control section 243, all of them shown in FIG. 3, will be detailed later.

FIG. 4 is a table showing concrete examples of output elements Qa to Qf for various connection terminals T1 to T6 in a case where the agricultural machine 110 is a combine harvester.

As listed in FIG. 4, the output elements Qa connected to the first connection terminals T1 are fed, from the first connection terminals T1, with 32 items of binary information, including warnings on a thresh switch, a harvest switch, an engine-related charge, a hydraulic pressure, water temperature, an overload, an, clogged air cleaner, a clogged rice straw discharger/cutter, and an emergency engine shutdown. The output elements Qb connected to the second connection terminals T2 are fed, from the second connection terminals T2, with 20 items of detected value information, including the rotation of the engine 112 for each unit time in and out of operation, the engine load ratio of the engine 112 approximately indicating a load on the engine 112 in and out of operation, the vehicle speed in and out of operation, and the rotation of the swing motor for each unit time in and out of operation. The output elements Qc connected to the third connection terminals T3 are fed with 4 items of integrated information (in this example, one item of integrated information) from the third connection terminals T3. The output elements Qd connected to the fourth connection terminals T4 are fed with 4 items of error information from the fourth connection terminals T4. The output elements Qe connected to the fifth connection terminals T5 are fed with 8 items of binary information from the fifth connection terminals T5. The output elements Qf connected to the sixth connection terminals T6 are fed with 2 items of detected value information (specifically, battery voltage and board temperature) from the sixth connection terminals T6.

The control section 240 includes the startup information transmission control section 241, the operation information transmission control section 242, and the location information transmission control section 243. The startup information transmission control section 241 provides a startup information transmitting function for the transmission of startup information under particular conditions. The operation information transmission control section 242 provides an operation information transmitting function for the transmission of operation information under particular conditions. The location information transmission control section 243 provides as a location information transmitting function for the transmission of location information and a date and time under particular conditions.

Next, the startup information transmitting function, the operation information transmitting function, and the location information transmitting function will be described one after the other.

Startup Information Transmitting Function

Figure 5:
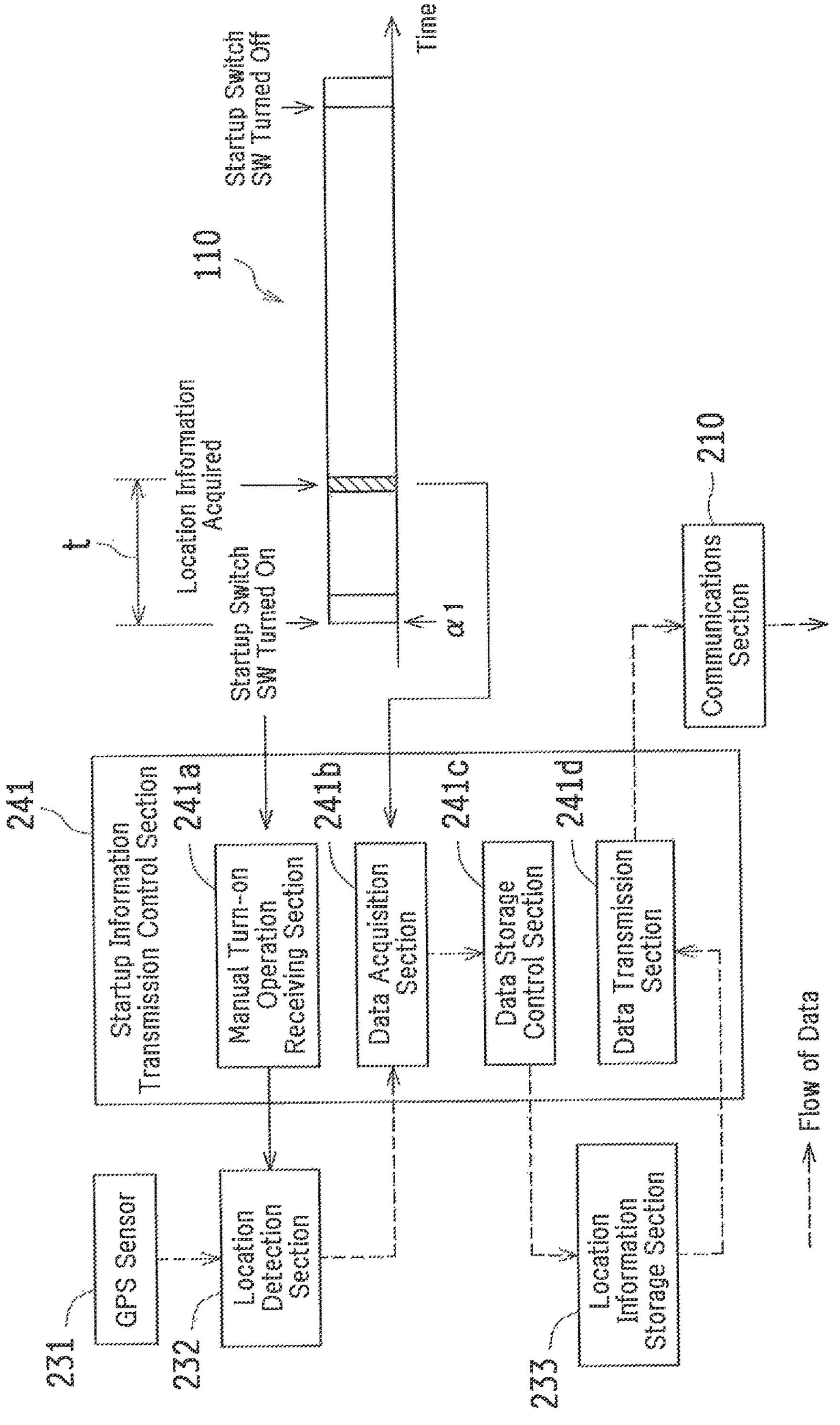
FIG. 5 is a schematic operation diagram of an operation process for a startup information transmitting function implemented by a startup information transmission control section in a control section.

FIG. 5 is a schematic operation diagram of an operation process for the startup information transmitting function implemented by the startup information transmission control section 241 in the control section 240.

The control section 240 includes the startup information transmission control section 241 which transmits startup information to the remote monitoring device 130 when the agricultural machine 110 is operated and the remote monitoring terminal device 200 is started up (specifically, remote monitoring terminal device 200 accepts a manual turn-on operation of the startup switch SW of the agricultural machine 110) (denoted by α1 in FIG. 5). The startup information contains the operation start location information (specifically, longitude and latitude) of the agricultural machine 110 and an operation start date and time (specifically, year, month, day, hour, minute, and second according to the global standard Gregorian calendar) obtained upon a startup. The location information may contain the velocity and orientation of the agricultural machine 110.

Specifically, the startup information transmission control section 241 operates as a work section containing a manual turn-on operation receiving section 241*a*, a data acquisition section 241*b*, a data storage control section 241*c*, and a data transmission section 241*d*. The manual turn-on operation receiving section 241*a* receives a manual turn-on operation of the startup switch SW of the agricultural machine 110. The data acquisition section 241*b* detects and acquires operation start location information and an operation start date and time of the agricultural machine 110 by means of the GPS sensor 231 and the location detection section 232 when the manual turn-on operation receiving section 241*a* has received a manual turn-on operation of the startup switch SW of the agricultural machine 110. The data storage control section 241*c* temporarily stores in the location information storage section 233 the operation start location information and operation start date and time acquired by the data acquisition section 241*b*. The data transmission section 241*d* transmits the operation start location information and operation start date and time stored in the location information storage section 233 to the remote monitoring device 130 via the communications section 210.

FIG. 6 is a schematic data structure table showing exemplary data stored in the location information storage section 233.

As illustrated in FIG. 6, the location information, storage section 233 stores therein an operation start date and time (specifically, year, month, day, hour, minute, and second according to the global standard Gregorian calendar) and operation start location information (latitude and longitude) when the startup switch SW of the agricultural machine 110 has been manually turned on (upon a startup). The location information storage section 233 further stores therein a date and time (specifically, year, month, day, hour, minute, and second according to the global standard Gregorian calendar) and location information (latitude and longitude) for each predetermined interval and each manual operation of a predetermined manual operation section, and a shutdown date and time (specifically, year, month, day, hour, minute, and second according to the global standard Gregorian calendar) and shutdown location information (longitude and latitude) when the startup switch SW of the agricultural machine 110 is manually turned off (upon a shutdown) by a first data acquisition section 243*a*, a manual turn off operation receiving section 243*b*, a second data acquisition section 243*c*, and a data storage control section 243*d* of the location information transmission control section 243, which are described later. "δ" illustrated in FIG. 6 is described later.

A time t from a manual turn-on operation of the startup switch SW to an acquisition of the operation start location information and an operation start date and time of the agricultural machine 110 in a detecting operation of the GPS sensor 231 (see FIG. 5) may be, for example, approximately 40 seconds to 180 seconds.

The location information storage section 233 stores therein startup information of a previous predetermined manual turn-on/off operation count portion (for example, 1-manual turn-on/off operation count portion) by setting an manual turn-on/off operation of the startup switch SW as 1-manual turn-on/off operation count.

The remote monitoring terminal device 200 converts, in the communications section 210, various pieces of information into a format that is in accordance with the communications protocols for the communications section 131 in the remote monitoring device 130. Thereafter, the remote monitoring terminal device 200 transmits the converted information to the remote monitoring device 130 over the communications network 140 and via the communications section 131. This enables the remote monitoring center to check the startup information (specifically, latitude and longitude and year, month, day, hour, minute, and second according to the global standard Gregorian calendar) of the agricultural machine 110. A similar arrangement applies to operation information for the operation information transmitting function and location information (detailed later) for the location information transmitting function.

Exemplary Operation of Startup Information Transmission Control Section

Next will be described an exemplary operation of the startup information transmission control section 241 in reference to FIG. 7 which is a flow chart depicting an exemplary operation of the startup information transmission control section 241.

Figure 7:
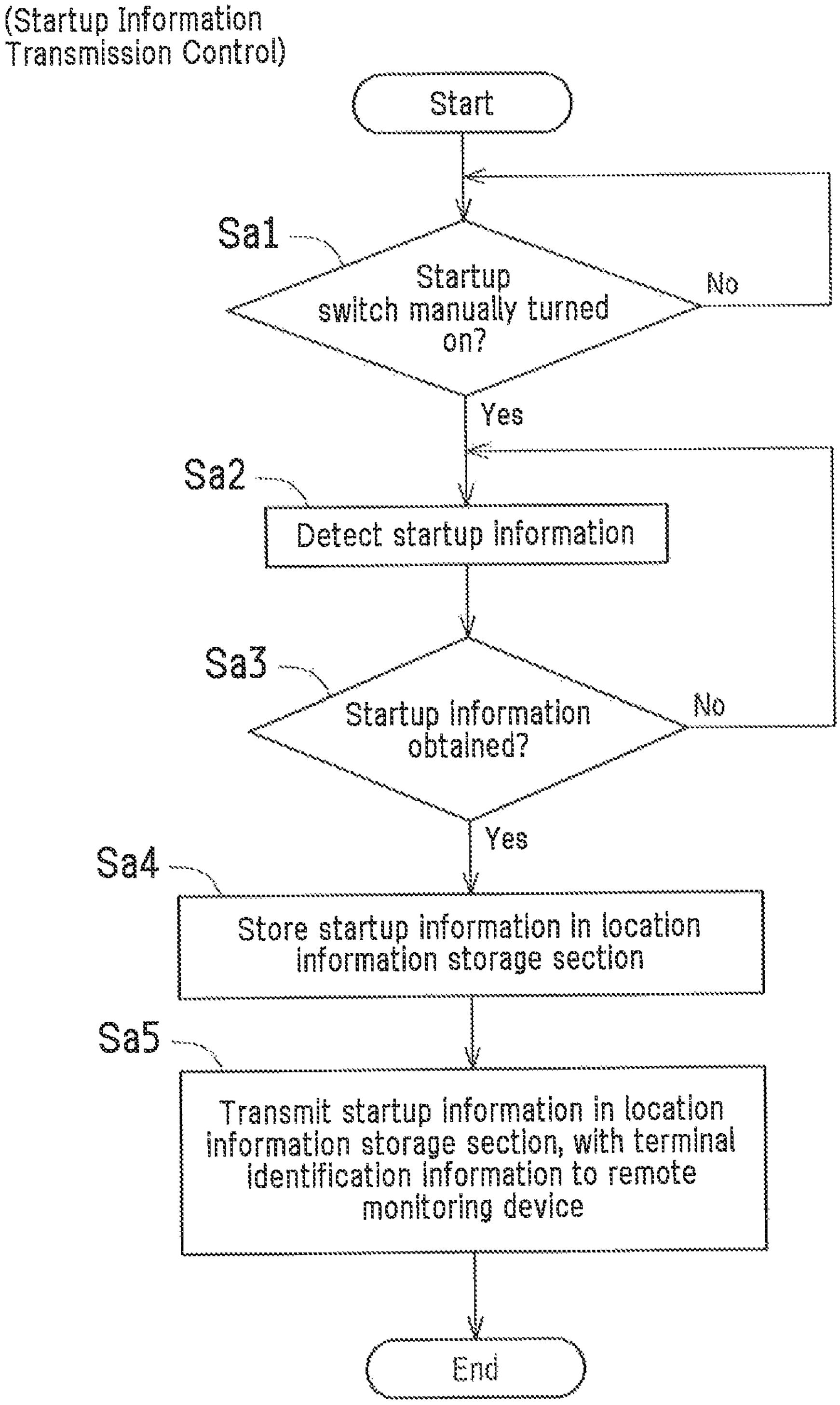
FIG. 7 is a flow chart depicting an exemplary operation of a startup information transmission control section.

According to the flow chart shown in FIG. 7, upon the startup switch SW being manually turned on (Yes in step Sa1), the OPS sensor 231 and the location detection section 232 detect the startup information of the agricultural machine 110 (in this example, operation start location information and an operation start date and time) (step Sa2).

Next, it is determined whether the startup information of the agricultural machine 110 has been acquired (step Sa3), and the process proceeds to step Sa2 if the startup information has not been acquired (No in step Sa3). On the other hand, if the startup information has been acquired (Yes in step Sa3), the acquired startup information is stored in the location information storage section 233 (step Sa4), and the startup information stored in the location information storage section 233 is transmitted to the remote monitoring device 130 with terminal identification information (here, terminal telephone number) of the remote monitoring terminal device 200 (step Sa5), which ends the process.

Operation Information Transmitting Function

Figure 8:
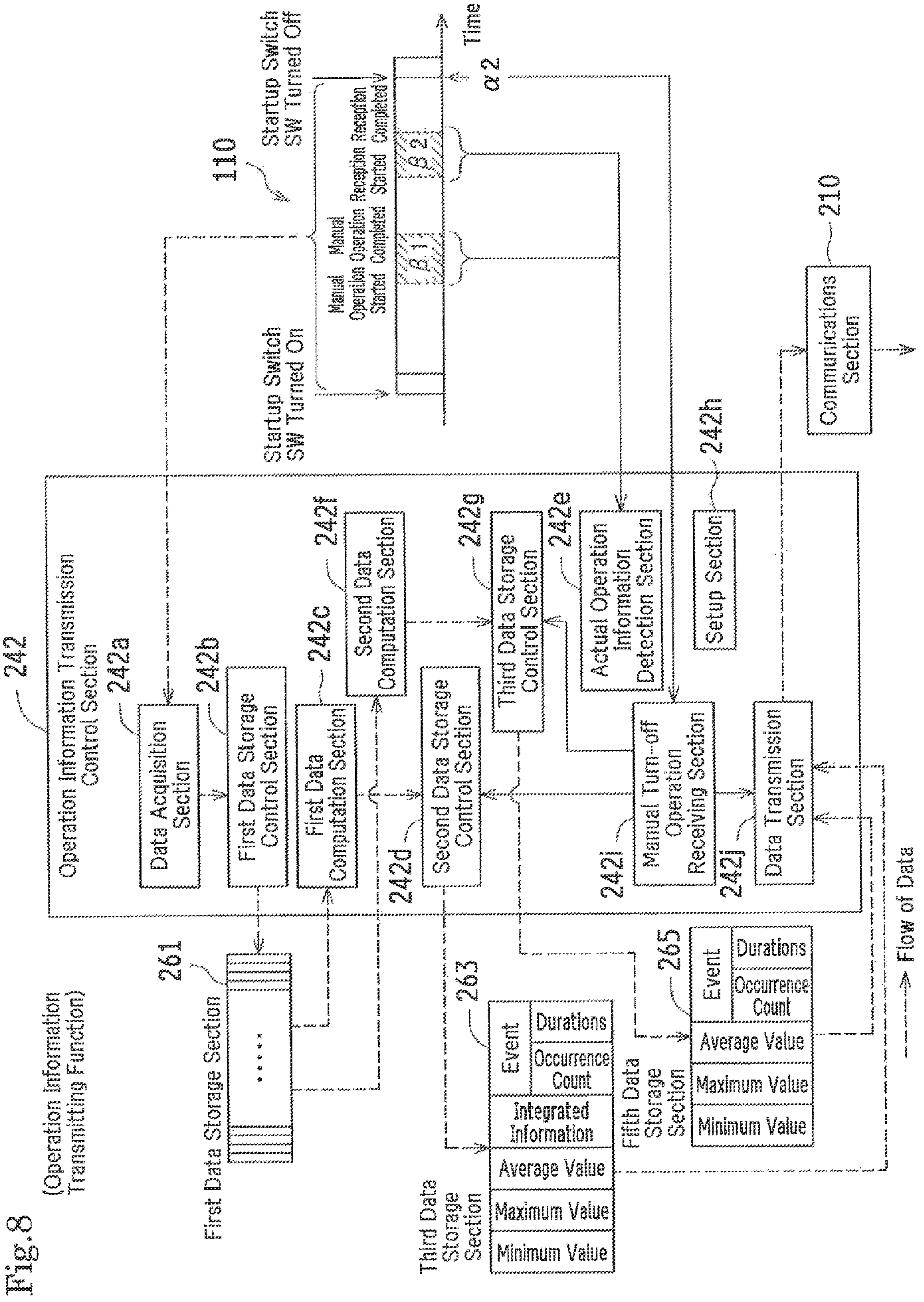
FIG. 8 is a schematic operation diagram of an operation process for an operation information transmitting function implemented by an operation information transmission control section in the control section.

FIG. 8 is a schematic operation diagram of an operation process for the operation information transmitting function implemented by the operation information transmission control section. 242 in the control section 240. The GPS sensor 231, the location detection section 232, and the location information storage section 233 are omitted in FIG. 8.

The control section 240 includes the operation information transmission control section (exemplary data abridging control section) 242 for transmitting operation information to the remote monitoring device 130 when the startup switch SW of the agricultural machine 110 is manually turned off (denoted by α2 in FIG. 8).

Specifically, the operation information transmission control section 242 operates as a work section containing a data acquisition section 242*a*, a first data storage control section 242*b*, a first data computation section 242*c*, and a second data storage control section 242*d*. The data acquisition section 242*a* acquires, at predetermined intervals (e.g., every 0.1 seconds), data (see FIGS. 4 and 6) on the operation state of the agricultural machine 110 fed, via the connection terminals T. The first data storage control section 242*b* temporarily stores in the first data storage section (specifically, ring buffer) 261 a predetermined number of latest data sets (points in time) (e.g., 600 sets (points in time)) in the cyclic data acquired by the data acquisition section 242*a*. The first data computation section 242*c* computes minimum, maximum, and average values of part of the data on the operation state collected over a period from a manual turn-on of the startup switch SW to the latest data acquisition and also an occurrence count and durations of a predetermined event during that period, all on the basis of the cyclic data stored in the first data storage control section 242*b*. The second data storage control section 242*d* temporarily stores in the third data storage section 263 the minimum and maximum values in the data on the operation state of the agricultural machine 110 and the occurrence count and durations of a predetermined event, all computed by the first data computation section 242*c*.

The operation information transmission control section 242 further operates as a work section containing an actual operation information detection section 242*e*, a second data computation section 242*f*, and a third data storage control section 242*g*. The actual operation information detection section 242*e* detects actual operation information on an actual operation. The second data computation section 242*f* computes, from the cyclic data stored in the first data storage control section 242*b*, minimum, maximum, and average values of actual operation data and an occurrence count and durations of a predetermined event. The actual operation data and the occurrence count and durations of a predetermined event are part of data on the operation state collected over a period from a manual turn-on of the startup switch SW to the latest data acquisition, the part being collected when the actual operation information detection section 242*e* has detected actual operation information. The third data storage control section 242*g* temporarily stores in the fifth data storage section 265 the minimum and maximum values in the actual operation data on the operation state of the agricultural machine 110 and the occurrence count and durations of a predetermined event, all computed by the second data computation section 242*f*. The above-described actual operation corresponds to a state in which the agricultural machine 110 contributes to work with some practical benefits (for example, effect of travelling motion, various works, etc.) in the state in which the agricultural machine 110 is started up. As the actual operation, for example, there is a state in the startup state other than an idling state (standby state).

In the operation information transmission control section 242, the data acquisition section 242*a*, the first data storage control section 242*b*, the first data computation section 242*c*, and the second data storage control section. 242*d* constitute a first storage control arrangement, whereas the data acquisition section 242*a*, the first data storage control section 242*b*, the actual operation information detection section 242*e*, the second data computation section 242*f*, and the third data storage control section 242*g* constitute the second storage control arrangement. The second data computation section 242*f* may in place of or in addition to, the configuration above, compute minimum, maximum, and average values of the data and an occurrence count and durations of a predetermined event when the actual operation information detection section 242*e* has detected non-actual operation information (e.g., idling state).

For example, the actual operation information detection section 242*e* detects whether a manual operation related to an actual operation of a predetermined manual operation section has been done or whether an actual operation signal related to an actual operation has been received from various predetermined sensors. Specifically, the actual operation information detection section 242*e* transmits manual operation signals to the second data computation section 242*f* from a start of a manual operation of a predetermined manual operation section (specifically, an actual operation turn-on) to an end of the manual operation (specifically, an actual operation turn-off) (denoted by β1 in FIG. 8). The actual, operation information detection section 242*e* also transmits to the second data computation section 242*f* sensor signals from various sensors from a start of reception (specifically, an actual operation turn-on) to an end of reception (specifically, an actual operation turn-off) (denoted by β2 in FIG. 8). The operation information transmission control section 242 is capable of distinguishing between an actual operation and a non-actual operation based on the manual operation signals and sensor signals from the actual operation information detection section 242*e*. The manual operation signals and sensor signals from the actual operation information detection section 242*e* may be signals indicating an actual operation state(s) of the predetermined manual operation section or various sensors (specifically, signals indicating an actual operation turn-on) or may be signals indicating an idling state(s) of the predetermined manual operation section or various sensors (specifically, signal indicating an actual operation turn-off).

In the second storage control arrangement, a predetermined manual operation section or various sensors that is/are to be involved in actual operation is determined in advance according to the type of data on the operation state. For example, if the data type is engine rotation, engine load ratio, or vehicle speed which are given as examples in FIG. 12 (detailed later), the gear shift lever is designated as the predetermined manual operation section which detects whether there has been a manual operation in the actual operation information detection section 242*e*.

The second data storage control section 242*d* temporarily stores integrated information and error information in the third data storage section 263. In the present embodiment, the first data storage section 261 is used as a ring buffer in which data is stored in storage areas arranged in series, both ends of the buffer being logically linked so that the buffer can be handled like a ring.

The operation information contains the location information (specifically, longitude and latitude) and the date and time (specifically, year, month, day, hour, minute, and second according to the global standard Gregorian calendar) (see FIG. 6) when the startup switch SW of the agricultural machine 110 is manually turned on; the location information (specifically, longitude and latitude) and the date and time (specifically year, month, day, hour, minute, and second according to the global standard Gregorian calendar) (see FIG. 6) when the startup switch SW of the agricultural machine 110 is manually turned off, the turn-on counts of the various switches Wa and We (i.e., the numbers of times that the various switches Wa and We are manually turned on) over a period from a manual turn-on to a subsequent manual turn-off of the startup switch SW of the agricultural machine 110; the turn-on durations of the various switches Wa and We (i.e., the durations in which the various switches Wa and We are turned on) during that period; the minimum, maximum, and average values of the detected values fed via the various sensors Wb and Wf; the integrated information obtained upon startups and shutdowns fed via the various sensors Wb and Wf, the occurrence count and durations of a predetermined event; and error information (specifically, error codes) for a predetermined, sequential occurrence count. The error information (specifically, error codes) other than for the predetermined occurrence count (e.g., 4) is not transmitted (not stored).

The predetermined interval is by no means limited in any particular manner and may be, for example, any first interval (specifically, 0.1 seconds) longer than 0 seconds and shorter than 1 second or any second interval (specifically, 1 second) longer than or equal to 1 second and shorter than 60 seconds. In this example, the predetermined interval is 0.1 seconds. The operation information transmission control section 242 may selectively switch between the first interval (specifically, 0.1 seconds) and the second interval (specifically, 1 second). When this is the case, the switching between the first and second intervals may be done either in the remote monitoring terminal device 200 or in the remote monitoring device 130.

The first storage control arrangement should be activated alone, the second storage control arrangement should be activated alone, or both the first and second storage control arrangements should be activated, together, depending on the type of data (e.g., engine rotation, engine load ratio, vehicle speed) on the operation state. In such cases, if the data collected when both the first and second storage control arrangements are being activated together was invariably transmitted to the remote monitoring device, efficiency in operation and transmission would be less than desirable.

Accordingly, in the present embodiment, the operation information transmission control section 242 operates as a work section further containing a setup section 242*h* which specifies, for each type of data on the operation state, an operation selection as to whether the first storage control arrangement should be activated alone (of the first and second storage control arrangements), the second storage control arrangement should be activated alone, or both the first and second storage control arrangements should be activated.

The operation information transmission control section 242 enables activation of at least either one of the first and second storage control arrangements in accordance with the operation selection specified by the setup section 242*h*. Specifically, if the operation selection specified by the setup section 242*h* is such that both the first and second storage control arrangements should be activated, the operation information transmission control section 242 enables activation of both control arrangements (the first and second storage control arrangements) for a corresponding type of data. If the operation selection specified by the setup section 242*h* is such that the first storage control arrangement should be activated alone, the operation information transmission control section 242 enables activation of the first storage control arrangement for a corresponding type of data. If the operation selection specified by the setup section 242*h* is such that the second storage control arrangement should be activated alone, the operation information transmission control section 242 enables activation of the second storage control arrangement for a corresponding type of data.

Settings for an operation selection for at least either one of the control arrangements (first and second storage control arrangements) may be changed in the remote monitoring terminal device 200 or in the remote monitoring device 130. Value settings for the first and second intervals and items of the binary information, detected value information, and error information may be changeable. When this is the case, the value settings for the first and second intervals and items of the binary information, detected value information, and error information may be changed in the remote monitoring terminal device 200 or in the remote monitoring device 130. In addition, the remote monitoring terminal device 200 may be capable of accepting or rejecting an instruction from the remote monitoring device 130 for a change in the settings for operation selection for the control arrangements and for a change in the value settings for the first and second intervals and the items of the binary information, detected value information, and error information.

An occurrence of a predetermined event is an occurrence of a predetermined manual operation or action or of a change in state which can happen accidentally or indeliberately in the agricultural machine 110. A predetermined event can happen, for example, when an error has occurred which indicates an irregularity (specifically, irregular charge (power generation), irregular hydraulic pressure, irregular water temperature, etc) during a predetermined procedure, when a predetermined manual operation section (specifically, a manual traveling operation section, a manual harvesting operation section, a manual threshing operation section, etc.) has received a manual tarn-on or turn-off operation of a switch (e.g., a travel switch, a harvest switch, a thresh switch, etc) for a predetermined, procedure, or when the detected value detected by a sensor goes beyond a predetermined threshold.

The first and second storage control arrangements of the operation information transmission control section 242 are capable of determining maximum, minimum, and average values of detected value information and an occurrence count and durations of an event, for example, as detailed in the following.

The manual turn-off operation receiving section 242*i* and the data transmission section. 242*j* shown in FIG. 8 will be detailed later.

FIG. 9 is a diagram illustrating an exemplary operation for the first storage control arrangement of the operation information transmission control section 242 to determine maximum, minimum, and average values of detected value information and an occurrence count and durations of an event. FIG. 10 is a diagram illustrating an exemplary operation for the second storage control arrangement of the operation information transmission control section 242 to determine maximum, minimum, and average values of detected value information and an occurrence count and durations of an event.

In the exemplary operation of the operation information transmission control section 242 shown in FIGS. 9 and 10, under the control of the first data storage control section 242*b*, the data acquisition section 242*a* temporarily stores data sets DT(1) to DT(n) is an integer greater than or equal to 2) in the first data storage section 261 at predetermined intervals TA (e.g., every 0.1 seconds) starting when the startup switch SW of the agricultural machine 110 is manually turned on. Accordingly, the first data storage section 261, under the control of the first data storage control section 242*b*, stores therein the cyclic binary information (specifically, contact point information and error presence/absence information) detected at the output elements (Qa, Qe, etc.) and the cyclic detected value information (specifically, rotational speed and engine load ratio of the engine 112, vehicle speed, error codes, board temperature, battery voltage, etc.) detected at the output elements (Qb, Qf, etc.). The first data storage section 261 further stores therein the cyclic integrated information (integrated time) detected at the output elements (Qc, etc.) and the cyclic error information detected at the output elements (Qd, etc.) under the control of the first data storage control section 242*b*.

To determine a maximum value in the detected value information (specifically, rotation of the engine 112 for each unit time, engine load ratio, vehicle speed, etc.), the first and second data computation sections 242*c* and 242*f* store the detected value information detected at the output elements (Qb, Qf, etc.) in the third and fifth data storage sections 263 and 265 under the control of the second and third data storage control sections 242*d* and 242*g* and compare the detected value information subsequently detected at the output elements (Qb, Qf, etc.) with the detected value information stored in the third and fifth data storage sections 263 and 265. If the detected value information detected at the output elements (Qb, Qf etc.) is greater than the detected value information stored in the third and fifth data storage sections 263 and 265, the first and second data computation sections 242*c* and 242*f* replace the detected value information, stored in the third and fifth data storage sections 263 and 265 with the detected value information detected at the output elements (Qb, Qf, etc.) to update a maximum value Dmax.

To determine a minimum value in the detected value information, the first and second data computation sections 242*c* and 242*f* store the detected value information detected at the output elements (Qb, Qf, etc.) in the third and fifth data storage sections 263 and 265 under the control of the second and third data storage control sections 242*d* and 242*g* and compare the detected value information subsequently detected at the output elements (Qb, Qf, etc.) with the detected value information stored in the third and fifth data storage sections 263 and 265. If the detected value information detected at the output elements (Qb, Qf, etc.) is smaller than the detected value information stored in the third and fifth data storage sections 263 and 265, the first and second data computation sections 242*c* and 242*f* replace the detected value information stored in the third and fifth data storage sections 263 and 265 with the detected value information detected at the output elements (Qb, Qf, etc.) to update a minimum value Dmin.

To calculate an average value of the detected value information, the first and second data computation sections 242*c* and 242*f* temporarily store a predetermined number, j, (e.g., j=60) of latest sampling data sets DTA(1)(=DT(1)), DTA(2) (=DT(11)), DTA(3) (=DT(21)), . . . , and DTA(i) (=DT(n−9)) (i=n/m) in intermediate storage sections (specifically, ring buffers) 261*a* and 261*b* under the control of the second and third data storage control sections 242*d* and 242*g*. The sampling data DTA(1) to DTA(i) is a subset of all the latest data sets DT(1) to DT(n) (n is an integer greater than or equal to 2) stored in the first data storage section 261 and made up of those cyclic data sets with an averaging interval TB which is a multiple of the predetermined interval TA. The multiplication factor, m, is an integer greater than or equal to 2 (e.g., m=10, TA=0.1 seconds, TB=TA×m=0.1 seconds×10=1 second).

Next, the first and second data computation sections 242*c* and 242*f* calculate sums TLA(1) (=DTA(1)+ . . . +DTA(j)), . . . , and TLA(k) (=DTA(i−(j−1))+ . . . +DTA(i)) (k=i/j), each being a sum of a further subset of the subset (sampling data) DTA(1) to DTA(i) obtained by sampling the subset DTA(1) to DTA(i) at sampling intervals TC. The sampling interval TC is equal to the averaging interval TB times j, where j is an integer multiplication factor greater than or equal to 2 (e.g., j=60, TC=TB×j=1 second×60=1 minute). The first and second data computation sections 242*c* and 242*f* then divide the sums by the integer multiplication factor j (e.g., j=60) to obtain values TLA(1)/j, . . . , and TLA(k)/j as 1-minute average values AVA(1), . . . , and AVA(k). The first and second data computation sections 242*c* and 242*f* temporarily store the obtained 1-minute average values AVA(1), . . . , and AVA(k) in the second and fourth data storage sections 262 and 264 at the sampling intervals TC under the control of the second and third data storage control sections 242*d* and 242*g*.

When the startup switch SW is manually turned off, the first and second data computation sections 242*c* and 242*f* calculate a total sum TLB of the 1-minute average values AVA(1), . . . , and AVA(k) stored in the second and fourth data storage sections 262 and 264 and divide the total sum TLB by the number, k, of the 1-minute average values AVA(1), . . . , and AVA(k) to obtain a value TLB/k as an average value AVB. The obtained average value AVB is stored in the third and fifth data storage sections 263 and 265 under the control of the second and third data storage control sections 242*d* and 242*g*.

To calculate an occurrence count and durations of an event, the first and second data computation sections 242*c* and 242*f* store a turn-on count (number of OFF-to-ON changes) DTE1 and a turn-on duration DTE2 available in the contact point information at the output elements (Qa, Qe, etc.) and a turn-on count DTE1 and a turn-on duration DTE2 available in the error presence/absence information, at the output elements (Qa, Qe, etc.) in the third and fifth data storage sections 263 and 265 under the control of the second and third data storage control sections 242*d* and 242*g*. The first and second data computation sections 242*c* and 242*f* then add a turn-on count and a turn-on duration available next in the contact point information and the error presence/absence information at the output elements (Qa, Qe, etc.) to the turn-on count DTE1 and the turn-on duration DTE2 stored in the third and fifth data storage sections 263 and 265 for update.

The second data storage control section 242*d* stores an integrated time DS available at the output element Qc in the third data storage section 263 upon startups and shutdowns. The second data storage control section 242*d* also stores error information available at the output element Qd in the third data storage section 263 sequentially for a predetermined occurrence count starting from the first occurrence.

Figures 12, 13:
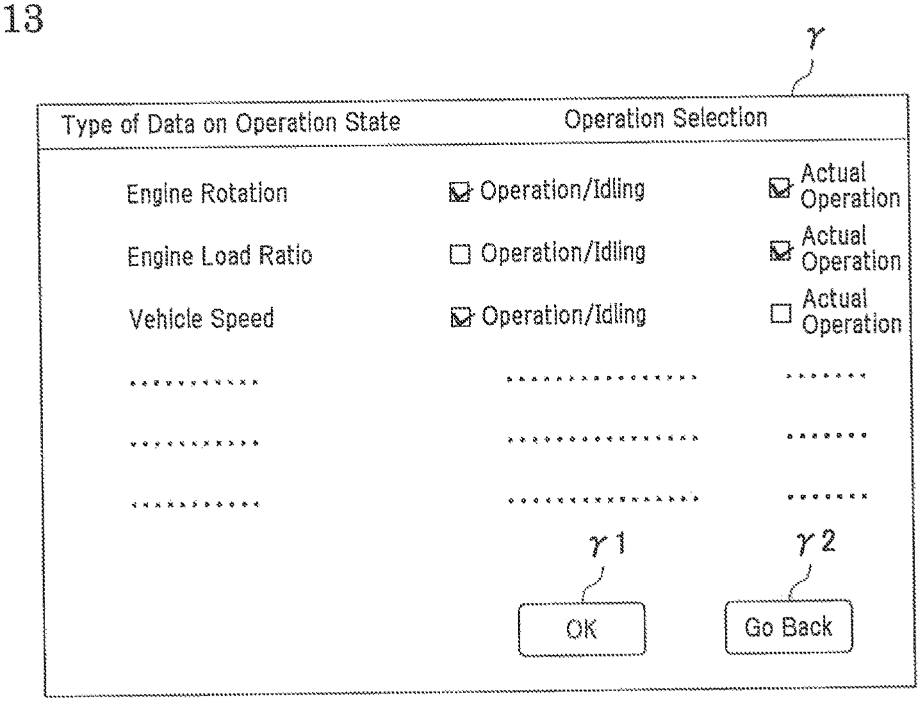
FIG. 12 is a schematic data structure table showing exemplary data for a fifth data storage section for use by the second storage control arrangement of the operation information transmission control section.
FIG. 13 is an illustration of an exemplary operation-selecting setup screen on a setup section.

FIG. 11 is a schematic data structure table showing exemplary data for the third data storage section 263 for use by the first storage control arrangement of the operation information transmission control section 242. FIG. 12 is a schematic data structure table showing exemplary data for the fifth data storage section 265 for use by the second storage control arrangement of the operation information transmission control section 242.

As listed in FIG. 11, under the control of the second data storage control section 242*d*, the third data storage section 263 stores therein, as data on the operation state containing the idling state obtained over a period from a manual turn-on to a manual turn-off of the startup switch SW, the turn-on count and turn-on duration in the form of binary information (specifically, contact point information and error presence/absence information) and the maximum, minimum, and average values, as well as the integrated information, of the detected value information (specifically, rotation of the engine 112 for each unit time, engine load ratio, vehicle speed, etc.).

As listed in FIG. 12, under the control of the third data storage control section 242*g*, the fifth data storage section 265 stores therein, as actual operation data on the actual operation state over a period from a manual turn-on to a manual turn-off of the startup switch SW, the turn-on count and turn-on duration in the form of binary information (specifically, contact point information and error presence/absence information) and the maximum, minimum, and average values, as well as the integrated information, of the detected value information (specifically, rotation of the engine 112 for each unit time and engine load ratio, vehicle speed, etc.). In FIG. 12, the working engine rotation refers to the rotational speed of the engine 112 in actual operation. The working engine load ratio refers to an engine load ratio in actual operation. The working vehicle speed refers to a vehicle speed in actual operation.

The operation information transmission control section 242 (see FIG. 8) further operates as a work section containing a manual turn-off operation receiving section 242*i* and a data transmission section 242*j*. The manual turn-off operation receiving section 242*i* receives a manual turn-off operation of the startup switch SW of the agricultural machine 110. The data transmission section 242*j* transmits, to the remote monitoring device 130 via the communications section 210, the maximum, minimum, and average values, the occurrence count and durations of an event, and the integrated information, all stored in the third data storage section 263 when the manual turn-off operation receiving section 242*i* has received a manual turn-off operation of the startup switch SW. The data transmission section 242*j* further transmits, to the remote monitoring device 130 via the communications section 210, the location information and date and time stored in the location information storage section 233 when the manual turn-off operation receiving section 242*i* has received a manual turn-off operation of the startup switch SW.

FIG. 13 is an illustration of an exemplary operation-selecting setup screen γ on a setup section 242*h*.

The operation-selecting setup screen γ in FIG. 13 shows engine rotation, engine load ratio, and vehicle speed, as examples of types of data on the operation state. The operation selection of "Operation/Idling" means an operation selection for the first storage control arrangement, the operation selection of "Actual Operation" means an operation selection for the second storage control arrangement.

In the exemplary operation-selecting setup screen γ, both "Operation/Idling" and "Actual Operation" are being selected (specifically, checkboxes are ticked) for engine rotation; "Actual Operation" alone is being selected for engine load ratio; and "Operation/Idling" alone is being selected for vehicle speed. A manual operation of the "OK" button γ1 on the operation-selecting setup screen γ establishes the operation selection, whereas a manual operation of the "Go back" button γ2 on the operation-selecting setup screen returns to the previous screen.

The setup section 242*h* stores the operation selection specified on the setup screen γ as a flag in the storage section 260. For example, for each type of data on the operation state, if "Actual Operation" alone is selected, "1" is stored in the storage section 260; if "Operation/Idling" alone is selected, "2" is stored in the storage section 260; and if both "Actual Operation" and "Operation/Idling" are selected, "3" is stored in the storage section 260. The operation information transmission control section 242 performs the process(es) of the first data computation section 242*c*, the second data computation section 242*f*, or both the first data computation section 242*c* and the second data computation section 242*f* for each type of data on the operation state in accordance with the flag stored in the storage section 260.

The setup section 242*h* allows to specify at least one operation selection from the first and second storage control arrangements for each of p types of data on the operation state (p is an integer greater than or equal to 2). For example, minimum and maximum values in both the first and second storage control arrangements for each of p types of data (2×p types of data) and an occurrence count and durations of a predetermined event can be obtained by making a maximum operation selection, in other words, by making an operation selection for both the first and second storage control arrangements for each of p types of data. This is, however, by no means limiting the invention. The number of selectable operations may be restricted to improve the transmission efficiency of transmission to the remote monitoring device 130. When this is the case, for example, assuming that p=6, there are a maximum of 12 types of data if an operation selection is made for both the first and second storage control arrangements for each of 6 types of data. It follows that with the number of selectable operations being restricted to 10, an operation selection can be made for both the first and second storage control arrangements for each of a maximum of 4 types of data out of the 6 types of data, whereas an operation selection can be made for any one of the control arrangements (first and second storage control arrangements) for the remaining 2 types of data.

When the startup switch SW is manually turned off, power supply to the control section 240 is not turned off by the power supply control section 220. The power supply is turned off by the power supply control section 220 after the data transmission section **242*j*** has transmitted the maximum, minimum, and average values, the occurrence count and durations of an event, and the integrated information, as well as the location information and date and time.

The third data storage section 263 stores therein operation information for a predetermined number of previous manual turn-on/off operations (e.g., for 30 manual turn-on/off operations). A pair of manual turn-on and turn-off operations of the startup switch SW is counted as a single manual turn-on/off operation.

Exemplary Operation of Operation Information Transmission Control Section

Next will be described an exemplary operation of the first and second storage control arrangements of the operation information transmission control section 242 in reference to FIGS. 14 to 17.

Figure 14:
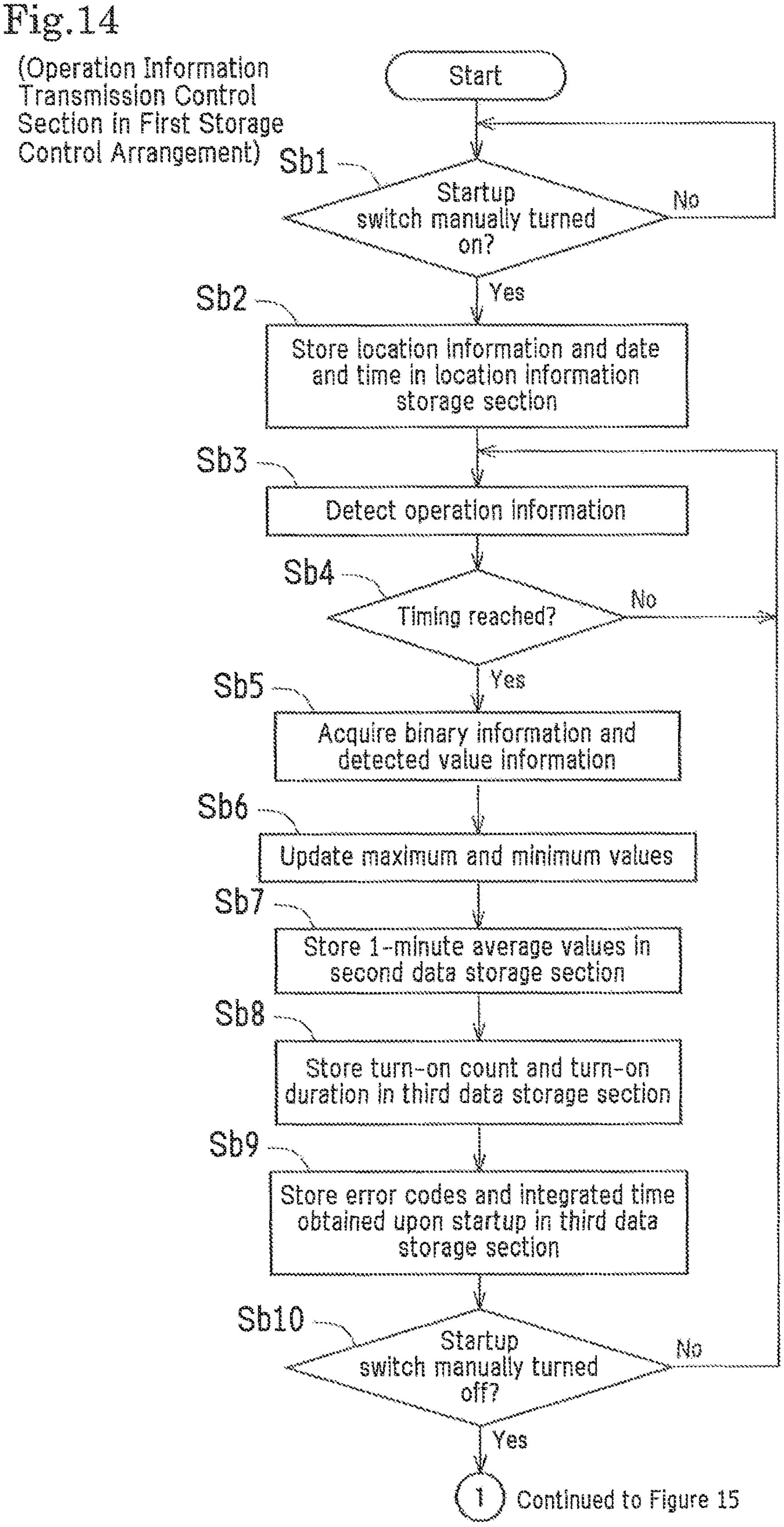
FIG. 14 is a flow chart depicting a first half of an exemplary operation of the first storage control arrangement of the operation information transmission control section.
Figure 15:
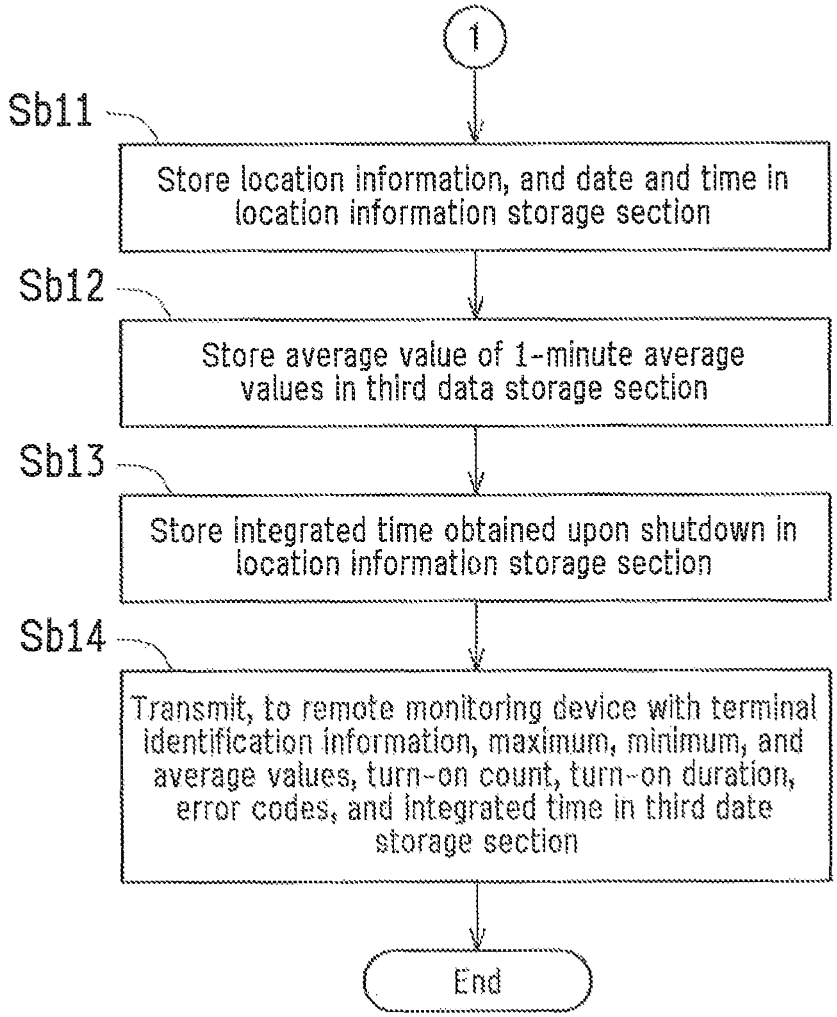
FIG. 15 is a flow chart depicting a second half of the exemplary operation of the first storage control arrangement of the operation information transmission control section.

FIGS. 14 and 15 are flow charts respectively depicting the first and second halves of an exemplary operation of the first storage control arrangement of the operation information transmission control section 242.

According to the flow chart shown in FIG. 14, upon the startup switch SW being manually turned on (Yes in step Sb1), the GPS sensor 231 and the location detection section 232 (see FIG. 3) acquire the location information of the agricultural machine 110 and a date and time and store them in the location information storage section 233 (see FIG. 3) (step Sb2).

Next, the operation information of the agricultural machine 110 is detected at the output elements Q (step Sb3), and it is determined whether a timing has been reached in accordance with the predetermined intervals TA (in this example, TA=0.1 seconds) (step Sb4). If a timing has not been reached in accordance with the predetermined intervals TA (No in step Sb4), the process proceeds to step Sb3. On the other hand, if it is determined in step Sb4 that a timing has been reached in accordance with the predetermined intervals TA (Yes in step Sb4), the binary information and detected value information are acquired at the output elements Q (step Sb5), the maximum value Dmax and minimum value Dmin in the detected value information is updated in the third data storage section 263 (step Sb6) (see FIG. 9). One-minute average values AVA(1) to AVA(k) of the detected value information are calculated and stored in the second data storage section 262 (step Sb7) (see FIG. 9). The turn-on count DTE1 and turn-on duration DTE2 in the contact point information and error presence/absence information are added and stored in the third data storage section 263 (step Sb8). The error codes and integrated time DS obtained upon a startup are stored in the third data storage section 263 (step Sb9).

Next, it is determined whether the startup switch SW has been manually turned off (step Sb10). If the startup switch SW has not been manually turned off (No in step Sb10), the process proceeds to step Sb3. On the other hand, if it is determined in step Sb10 that the startup switch SW has been manually turned off (Yes in step Sb10), the GPS sensor 231 and the location detection section 232 (see FIG. 3) acquire the location information of the agricultural machine 110 and a date and time and store them in the location information storage section 233 (see FIG. 6) (step Sb11), followed by the calculation of the average value AVB of the individual 1-minute average values AVA(1) to AVA(k) stored in the second data storage section 262 and the storing of the average value AVB in the third data storage section 263 (step Sb12), as illustrated in FIG. 15.

Next, the integrated time DS obtained upon a shutdown is stored in the third data storage section 263 (step Sb13). The maximum value Dmax, minimum value Dmin, and average value AVB, the turn-on count DTE1 and turn-on duration DTE2 in the contact point information and error presence/absence information, and the error codes and integrated time DS obtained upon startups and shutdowns, all stored in the third data storage section 263, are transmitted to the remote monitoring device 130 with terminal identification information (here, terminal telephone number) (step Sb14), which ends the process. When the process is ended, the location information and date and time (see FIG. 6) obtained upon startups and shutdowns and stored in the location information storage section 233 are transmitted to the remote monitoring device 130.

Figure 16:
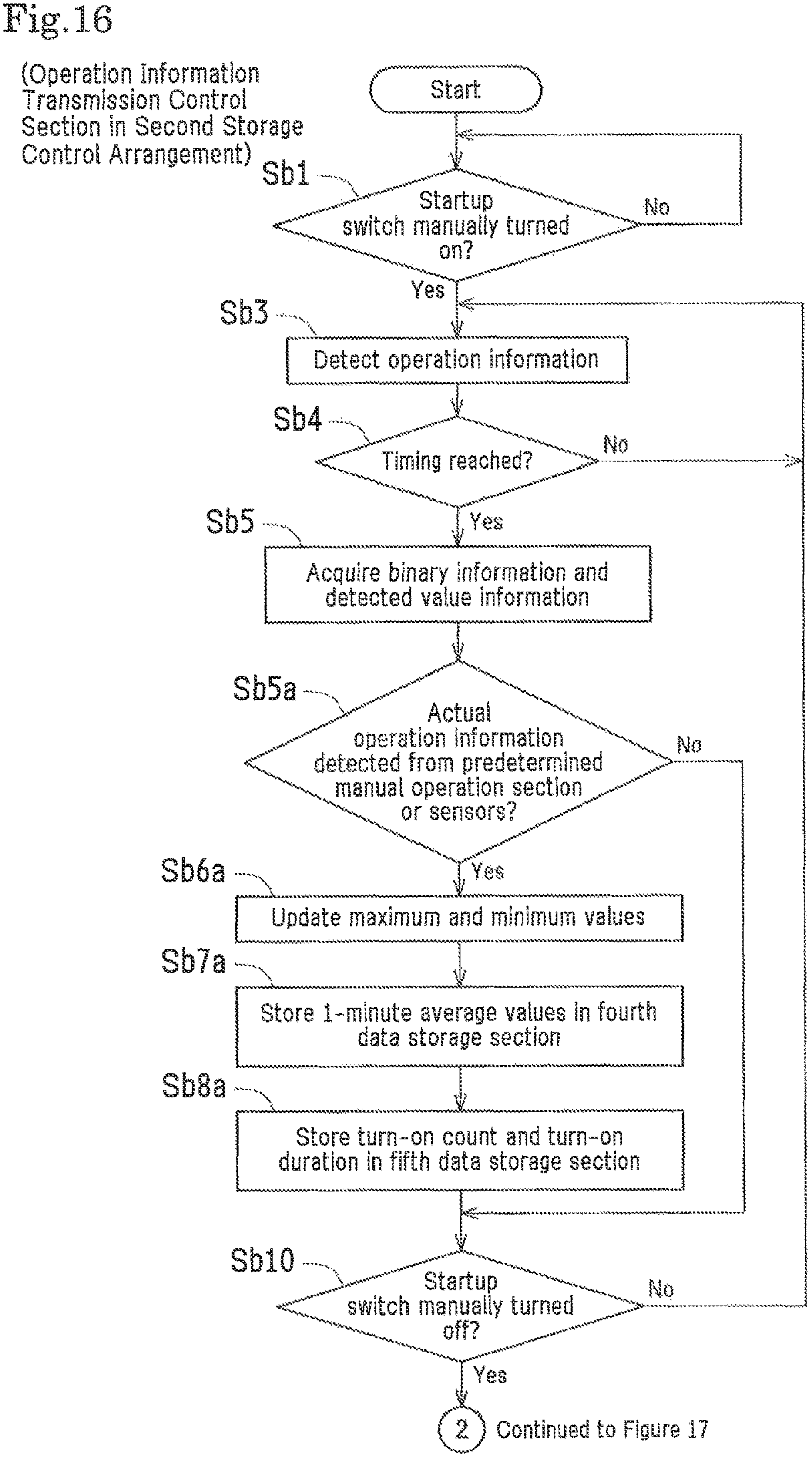
FIG. 16 is a flow chart depicting a first half of an exemplary operation of the second storage control arrangement of the operation information transmission control section.
Figure 17:
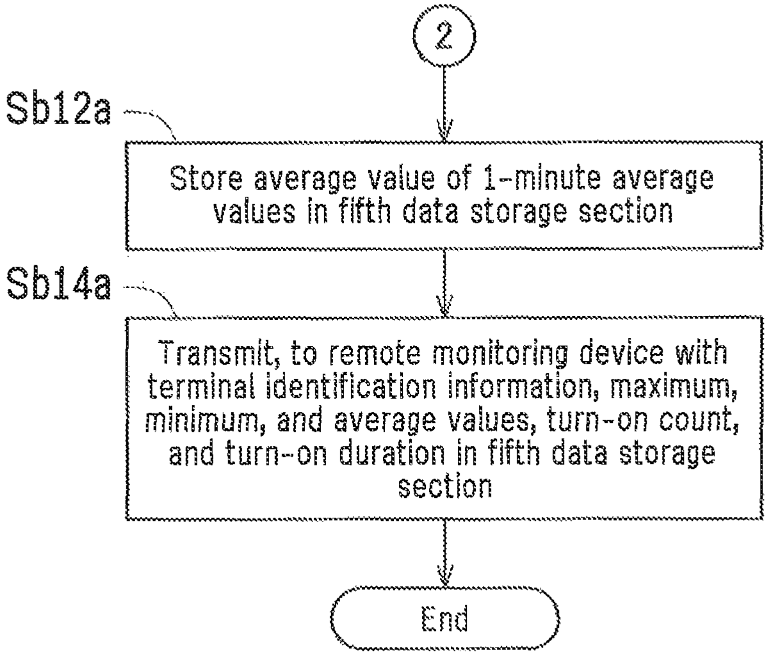
FIG. 17 is a flow chart depicting a second half of the exemplary operation of the second storage control arrangement of the operation information transmission control section.

FIGS. 16 and 17 are flow charts respectively depicting the first and second halves of an exemplary operation of the second storage control arrangement of the operation information transmission control section 242.

The flow charts shown in FIGS. 16 and 17 differ from the flow charts shown in FIGS. 14 and 15 in that: steps Sb2, Sb9, Sb11, and Sb13 are omitted; steps Sb**6*a* to Sb8*a*, Sb12*a*, and Sb14*a* replace steps Sb6 to Sb8, Sb12, and Sb14; and step Sb5*a* is added between step Sb5 and step S6*a*. The following will describe the flow charts shown in FIGS. 16 and 17, focusing on differences from those shown in FIGS. 14 and 15**.

According to the flow charts shown in FIGS. 16 and 17, it is determined in step Sb**5*a* whether actual operation information is detected in the data from the predetermined manual operation section and the various sensors. If actual operation information is detected (Yes in step Sb5*a*), the process proceeds to step Sb6*a*. On the other hand, if no actual operation information is detected (No in step Sb5*a*), the process proceeds to step Sb10**.

In step Sb**6*a*, the maximum value Dmax and minimum value Dmin in the detected value information are updated in the fifth data storage section 265 (see FIG. 10**).

In step Sb**7*a*, 1-minute average values AVA(1) to AVA(k) of the detected value information are calculated and stored in the fourth data storage section 264 (see FIG. 10**).

In step Sb**8*a*, the turn-on count DTE1 and turn-on duration DTE2 in the contact point information and error presence/absence information are added and stored in the fifth data storage section 265**.

In step Sb**12*a*, an average value AVB of the individual 1-minute average values AVA(1) to AVA(k) stored in the fourth data storage section 264 is calculated and stored in the fifth data storage section 265**.

In step Sb**14*a*, the maximum value Dmax, minimum value Dmin, and average value AVB, as well as the turn-on count DTE1 and turn-on duration DTE2 in the contact point information and error presence/absence information, stored in the fifth data storage section 265 are transmitted to the remote monitoring device 130** with the terminal identification information (here, terminal telephone number).

When both the first and second storage control arrangements are activated, a combination of the process shown in FIGS. 14 and 15 and the process shown in FIGS. 16 and 17 can be implemented.

The operation information transmitting function described above enables transmission to the remote monitoring device 130 of the data needed to inform a user of the operation state, including the minimum, maximum, average values, and integrated information of the data on the operation state of the agricultural machine 110 collected over a period from a startup to the latest data acquisition, and the occurrence count and durations of a predetermined event, when the startup switch SW of the agricultural machine 110 is manually turned off. Therefore, a user is capable of being informed of the operation state, including the maximum, minimum, and average values for each sensor of the agricultural machine 110 and the turn-on count of the switch of the agricultural machine 110. Accordingly, a user is enabled to exploit the stored information to manage the operation of the agricultural machine 110 over an extended period of time (e.g., daily job reports, scheduled maintenance, information on actual use in the field, and diagnosis of parts through analysis of long-term data (aging degradation)). In addition, because the operation information, which is an abridged version of the detected value information, such as the maximum, minimum, and average values, the occurrence count and durations of an event, and the integrated information, is transmitted to the remote monitoring device 130 under the control of the operation information transmission control section 242, data can be easily collected in the remote monitoring device 130 for analysis. Another advantage is reduction of the storage capacity of a storage section (not shown) in the remote monitoring device 130 and of the communications load on the communications network 140.

Besides, since the operation information transmission control section 242 includes the second storage control arrangement, the minimum, maximum, and average values of actual operation data and the occurrence count and durations of a predetermined event can be transmitted to the remote monitoring device 130. Therefore, the user is capable of being informed of minimum, maximum, and average values of a particular type of data on a running state or a particular one of predetermined manual operation sections and various sensors related to actual operation and an occurrence count and durations of a predetermined event.

Furthermore, in the present embodiment, since at least either one of the first and second storage control arrangements is activated on the basis of the operation selection specified on the setup section 242*h*, the data obtained from at least either one of the first and second storage control arrangements can be transmitted to the remote monitoring device 130 according to one of the first and second storage control arrangements specified for each type of data on the operation state. Thus, efficiency in operation and transmission can be more readily improved.

Location Information Transmitting Function

Figure 18:
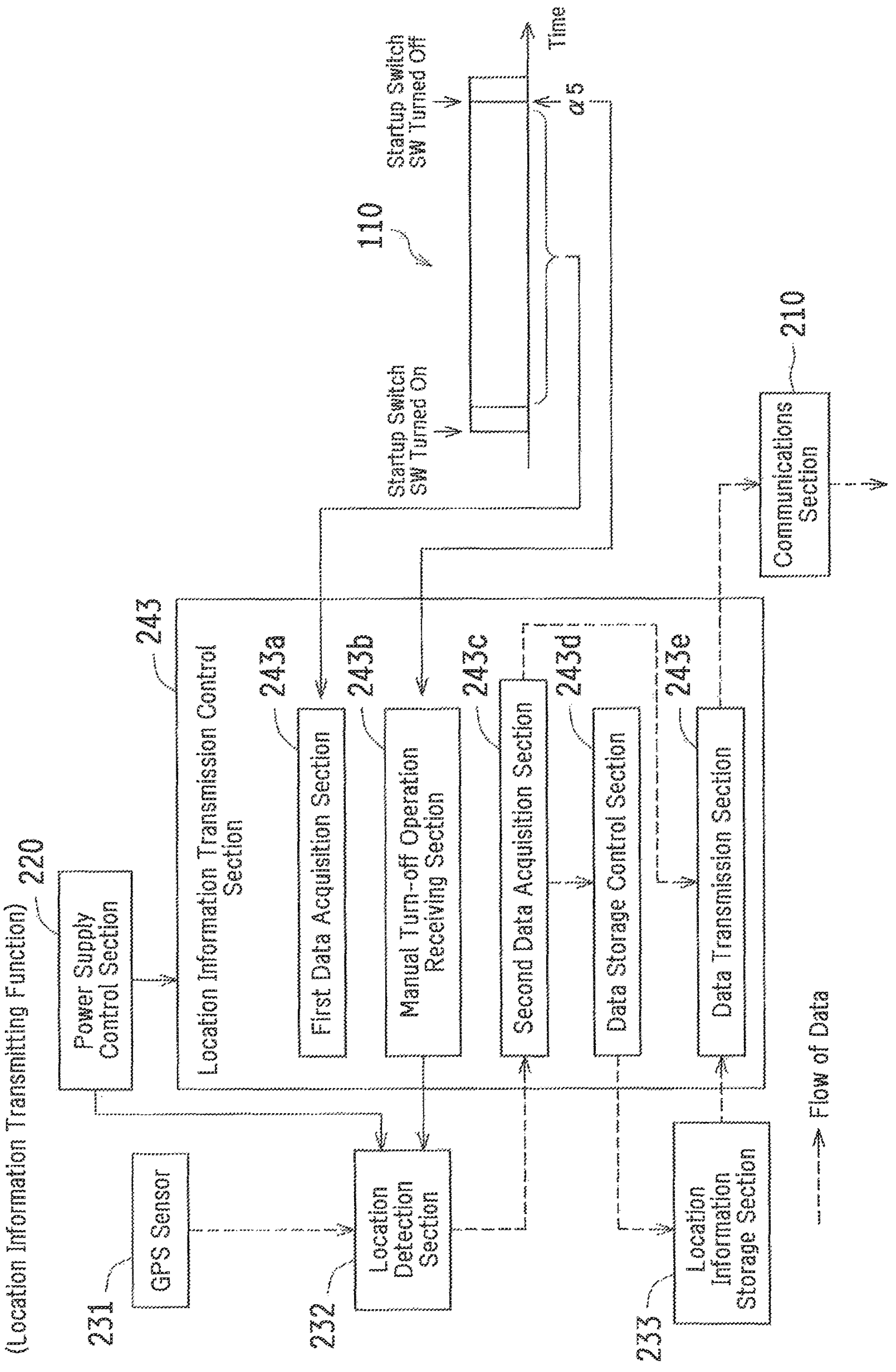
FIG. 18 is a schematic operation diagram of an operation process for a location information transmitting function implemented by a location information transmission control section in the control section.

FIG. 18 is a schematic operation diagram of an operation process for a location information transmitting function implemented by the location information transmission control section 243 in the control section 240.

The control section 240 includes the location information transmission control section 243 that obtains location information, and a date and time, for each predetermined interval (for example, 30 seconds) and each predetermined manual operation of a predetermined manual operation section (for example, a manual operation in which the travelling handle of the agricultural machine 110 corresponds to a predetermined rotation angle or more) during an operation the agricultural machine 110, and stores the location information and the date and time in the location information storage section 233 (see FIG. 6), stores shutdown location information (specifically, a longitude and latitude) and a shutdown date and time (specifically, year, month, day, hour, minute, and second according to the global standard Gregorian calendar), in the location information storage section 233 when the operation of the agricultural machine 110 is terminated and shut down (specifically, when the startup switch SW of the agricultural machine 110 is manually turned off (see α5 in FIG. 18)), and transmits, to the remote monitoring device 130, the location information and the date and time stored for each of the predetermined intervals and each of the manual operations of the predetermined manual operation section, and the shutdown location information and shutdown date and time stored when the startup switch SW is turned off.

Specifically, the location information transmission control section 243 operates as a work section containing the first data acquisition section 243*a*, the manual turn-off operation receiving section 243*b*, the second data acquisition section 243*c*, and the data storage control section 243*d*. The first data acquisition section 243*a* detects and obtains location information and a date and time, for each of the predetermined intervals (for example, 30 seconds) and each of the manual operations of the predetermined manual operation section (for example, the manual operation in which the travelling handle of the agricultural machine 110 corresponds to the predetermined rotation angle or more) through the GPS sensor 231 and the location detection section 232 in a time period in which the startup switch SW is turned on. The manual turn-off operation receiving section 243*b* accepts a manual turn-off operation of the startup switch SW of the agricultural machine 110. The second data acquisition section 243*c* detects and obtains location information and a date and time through the GPS sensor 231 and the location detection section 232 when the manual turn-off operation receiving section 243*b* accepts the manual turn-off operation. The data storage control section 243*d* temporarily stores the location information and date and time obtained by the first and second data acquisition sections 243*a* and 243*c*, in the location information storage section 233.

The data storage control section 243*d* stores location information (longitude and latitude) and a date and time (specifically, year, month, day, hour, minute, and second according to the global standard Gregorian calendar) during an operation of the agricultural machine 110, and shutdown location information (longitude and latitude) and a shutdown date and time (specifically, year, month, day, hour, minute, and second according to the global standard Gregorian calendar) when the startup switch SW of the agricultural machine 110 is manually turned off, in the location information storage section 233 (see FIG. 6).

The remote monitoring terminal device 200 continuously obtains location information for each of the predetermined intervals (for example, 30 seconds), and obtains location information regardless of the predetermined interval (for example, 30 seconds) when there is an manual operation of the predetermined manual operation section (for example, the manual operation in which the travelling handle of the agricultural machine 110 corresponds to the predetermined rotation angle or more). The date and time denoted in by δ in FIG. 6 is a date and time when there is the manual operation of the predetermined manual operation section (for example, the manual operation in which the travelling handle of the agricultural machine 110 corresponds to the predetermined rotation angle or more).

The location information transmission control section 243 operates as a work section containing a data transmission section 243*e* that transmits the location information and date and time stored in the location information storage section 233 from the communications section 210 to the remote monitoring device 130.

In the control section 240, the power is not turned off by the power supply control section 220 even when the startup switch SW is manually turned off and the power is turned off by the power supply control section 220 after the location information, and date and time are stored in the location information storage section 233 by the data storage control section 243*d*, and the location information, and date and time are transmitted to the remote monitoring device 130.

Exemplary Operation of Location Information Transmission Control Section

Figure 19:
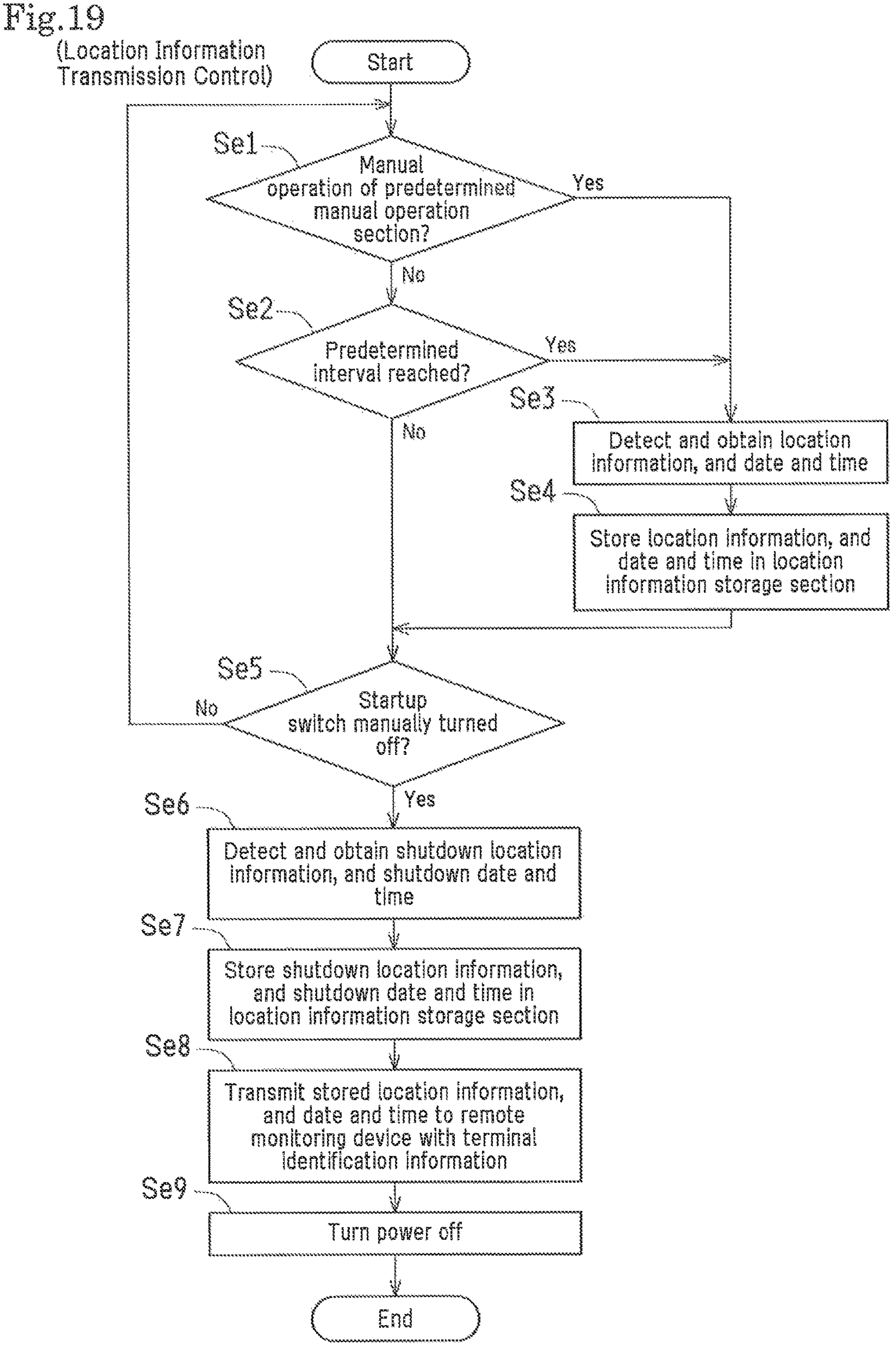
FIG. 19 is a flow chart depicting an exemplary operation of the location information transmission control section.

An exemplary operation of the location information transmission control section 243 is described below with reference to FIG. 19. FIG. 19 is a flow chart depicting an exemplary operation of the location information transmission control section 243.

In the flow chart illustrated in FIG. 19, first, it is determined whether or not there is the manual operation of the predetermined manual operation section (for example, the manual operation in which the travelling handle of the agricultural machine 110 corresponds to the predetermined rotation angle or more) (step Se1), and if there is the manual operation of the predetermined manual operation section (Yes in step Se1), the process proceeds to step Se3, and on the other hand, and if there is no manual operation of the predetermined manual operation section (No in step Se1), it is determined whether or not a predetermined interval (for example, 30 seconds) has been reached (step Se2). If the predetermined interval has not been reached yet (No in step Se2), the process proceeds to step Se5, and on the other hand, if the predetermined interval (for example, 30 seconds) has arrived (Yes in step Se2), location information, and a date and time of the agricultural machine 110 are detected and obtained through the GPS sensor 231 and the location detection section 232 (step Se3), and the obtained location information, and date and time are stored in the location information storage section 233 (step Se4).

Next, until the startup switch SW is manually turned off (No in step Se5), the processes of steps Se1 to Se4 are repeated. On the other hand, if the startup switch SW is manually turned off (Yes in step Se5), shutdown location information, and a shutdown date and time of the agricultural machine 110 are detected and obtained through the GPS sensor 231 and the location detection section 232 (step Se6), and the obtained shutdown location information and shutdown date and time are stored in the location information storage section 233 (step Se7).

The stored location information, and date and time are transmitted to the remote monitoring device 130 with the terminal identification information (here, terminal telephone number) (step Se8), and the power is turned off by the power supply control section 220 (step Se9), and the process ends.

Remote Monitoring Device

Figure 20:
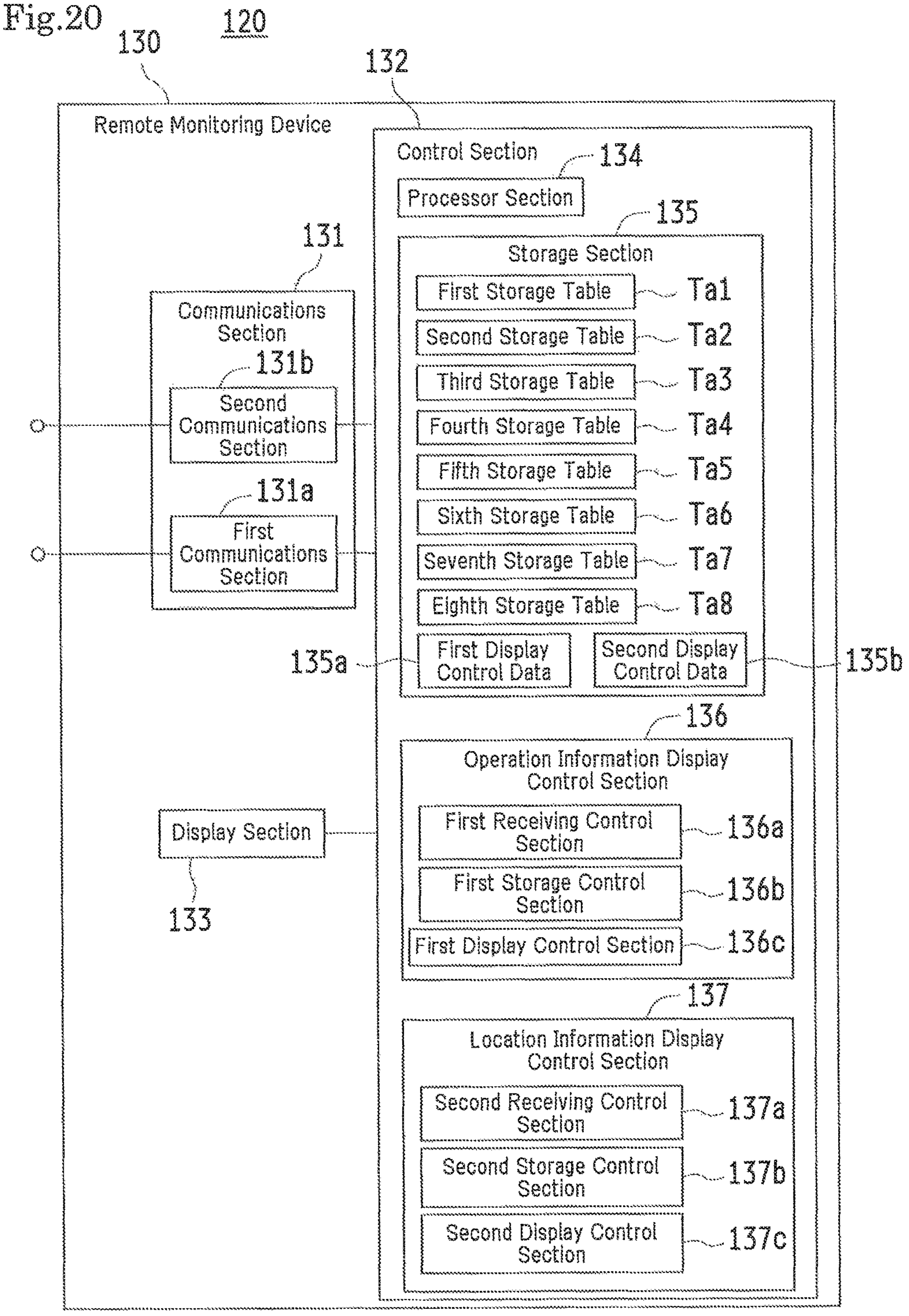
FIG. 20 is a schematic block diagram of the arrangement of a remote monitoring device that operates as the management server in the remote monitoring system.

FIG. 20 is a schematic block diagram of the arrangement of the remote monitoring device 130 that operates as the management server in the remote monitoring system 100.

As illustrated in FIG. 20, the remote monitoring device 130 in the remote monitoring center 120 includes a communications section 131, a control section 132 that transmits and receives data obtained upon a communication, and controls various input/outputs and computations, and a display section 133 (exemplary output section) that displays first and second display control data 135*a* and 135*b* (exemplary output control data), which is described later, from the control section 132. The communications section 131 includes first and second communications sections 131*a* and 131*b*.

First Communications Section

The first communications section 131*a* is allowed to perform communication by a communications protocol that is the same as the communications section 210 of the remote monitoring terminal device 200. Data that is transmitted and received obtained upon a communication is converted so as to be compatible with the communications protocol in the first communications section 131. The first communications section 131*a* receives startup information, operation information, and location information.

Second Communications Section

The second communications section 131*b* is allowed to perform communication by a communications protocol that is the same as communications sections 163 of the terminal devices 160 (specifically, client computers). Data that is transmitted and received obtained upon a communication is converted so as to be compatible with the communications protocol in the second communications section 131*b*. As described later, the second communications section 131*b* transmits the first and second display control data 135*a* and 135*b* to the terminal devices 160 (specifically, client computers).

Control Section

The control section 132 includes a processor section 134 constituted by a microcomputer such as a CPU (Central Processing Unit), and a storage section 135 including a volatile memory such as a ROM (Read Only Memory) and a RAM, and a rewritable non-volatile memory such as a hard disk device and a flash memory.

The control section 132 controls operations of various arrangement elements when the processor section 134 loads control programs stored in ahead in the ROM of the storage section 135, into the RAM of the storage section 135 and executes the control programs.

The control section 132 includes an operation information display control section 136 that operates as an operation information display function to display operation information, and a location information display control section 137 that operates as a location information display function to display location information.

Operation Information Display Function

The operation information display control section 136 receives a startup date and time of the remote monitoring terminal device 200, from the remote monitoring terminal device 200 when the remote monitoring terminal device 200 is started up, and receives, from the remote monitoring terminal device 200, a shutdown date and time of the remote monitoring terminal device 200, and minimum, maximum, and average values of data detected by the remote monitoring terminal device 200 during an operation of the agricultural machine 110, and an occurrence count and durations of an event when the remote monitoring terminal device 200 is shut down, and creates the first display control data 135*a* used to cause the display section 133 and/or a display section 162 to display the received startup date and time, shutdown date and time, minimum, maximum, and average values, and occurrence count and durations of the event, for each of the operation time periods from the startup to shutdown in the unit of the remote monitoring terminal device 200.

The first display control data 135*a* is data that is created by a markup language such as an HTML language used for description of a display screen of a web page. A first display control section 136*c* described later in the operation information display control section 136 displays the first display control data 135*a* stored in the storage section 135, on the display section 133. In the terminal devices 160 (specifically, client computers) connected to the remote monitoring device 130 (See FIG. 1), a control section 161 of the terminal device 160 obtains the first display control data 135*a* from the remote monitoring device 130, and displays the obtained first display control data 135*a* on the display section 162 of the terminal device 160.

The remote monitoring terminal device 200 is logged on through the terminal devices 160 when a dealer, user, etc. of the agricultural machine 110 performs an authentication operation such as input of a passcode.

Specifically, the operation information display control section 136 operates as a work section containing a first receiving control section 136*a*, a first storage control section 136*b*, and the first display control section 136*c*.

The first receiving control section 136*a* receives the startup date and time of the remote monitoring terminal device 200 with terminal identification information from the communications section 210 of the remote monitoring terminal device 200 when the agricultural machine 110 is operated and the remote monitoring terminal device 200 is started up (specifically, when the remote monitoring terminal device 200 accepts an manual turn-on operation of the startup switch SW of the agricultural machine 110), and receives the shutdown date and time of the remote monitoring terminal device 200, and the minimum, maximum, and average values, and occurrence count and durations of the event that are stored in the third data storage section 263 of the remote monitoring terminal device 200, with the terminal identification information, from the communications section 210 of the remote monitoring terminal device 200 when the operation of the agricultural machine 110 is terminated and the remote monitoring terminal device 200 is shut down (specifically, when the remote monitoring terminal device 200 accepts a manual turn-off operation of the startup switch SW of the agricultural machine 110).

FIG. 21 to FIG. 27 are schematic data structure tables showing exemplary data stored in the storage section 135, and are respective diagrams of first to seventh storage tables Ta1 to Ta7 provided in the storage section 135.

To the first storage table Ta1 illustrated in FIG. 21, an owner ID138*a* indicating an identification number of a user, a contract start date 138*b*, a contract end date 138*c*, a model 138*d* of a mobile work vehicle or vessel (here, the agricultural machine 110), a machine number 138*e*, and a terminal telephone number 138*f* used to communicate with and be connected to the remote monitoring terminal device 200 are registered.

To the second storage table Ta2 illustrated in FIG. 22, an owner name/company name 138*g* indicating a user, a group name 138*h*, and a maintenance personnel 138*i* who performs maintenance for the mobile work vehicle or vessel (here, the agricultural machine 110) are registered for the owner ID138*a*.

To the third storage table Ta3 illustrated in FIG. 23, a category 138*j*, a goods classification 138*k*, and a series name 138*l* are registered for the model 138*d*.

To the fourth storage table Ta4 illustrated in FIG. 24, a startup date 138*m* indicating a started-up date, an operation time period code indicating an operation time period (here, the operation time period number 138*n*), a startup date and time 138*o*, and a shutdown date and time 138*p* are registered for the terminal telephone number 138*f*. As described later, the date and time illustrated in FIG. 24, is a data and time converted from the coordinated universal time (date and time) to a local date and time.

To the fifth storage table Ta5 illustrated in FIG. 25, detected value information 138*q*, an average value 138*r*, a maximum value 138*s*, and a minimum value 138*t* are registered for the terminal telephone number 138*f* and the operation time period number 138*n*.

To the sixth storage table Ta6 illustrated in FIG. 26, binary information 138*u*, an occurrence count 138*v*1 of an event, and durations 138*v*2 of the event are registered for the terminal telephone number 138*f* and the operation time period number 138*n*.

To the seventh storage table Ta7 illustrated in FIG. 27, a latitude 138*w*1 and longitude 138*w*2 of startup location information that is location information obtained upon a startup, and a latitude 138*x*1 and longitude 138*x*2 of shutdown location information that is location information obtained upon a shutdown are registered for the terminal telephone number 138*f* and the operation time period number 138*n*.

The first storage control section 136*b* (see FIG. 20) stores the startup date 138*m*, startup date and time 138*o*, shutdown date and time 138*p* (see FIG. 24), average value 138*r*, maximum value 138*s*, minimum value 138*t* (see FIG. 25), and occurrence count 138*v*1 and durations 138*v*2 of the event (see FIG. 26) that are received by the first receiving control section 136*a*, in the fourth to sixth storage tables Ta4 to Ta6 of the storage section 135 (see FIGS. 24 to 26), for each of the operation time periods from the startup to shutdown (here, the operation time period number 138*n*) in a unit of terminal identification information (here, the terminal telephone number 138*f*) of the remote monitoring terminal device 200. Information obtained by combining the terminal telephone number 138*f*, the model 138*d*, and the machine number 138*e* is unique (1 to 1), so that the terminal identification information may be information obtained by combining the model 138*d* and the machine number 138*e*.

The first display control section 136*c* (see FIG. 20) creates the first display control data 135*a* used to cause the display section 133 and/or the display section 162 to display the startup date 138*m*, startup date and time 138*o*, shutdown date and time 138*p*, average value 138*r*, maximum value 138*s*, minimum value 138*t*, and occurrence count 138*v*1 and durations 138*v*2 of the event (see a sixth screen area G6 illustrated in FIG. 30 later) that are stored in the fourth to sixth storage tables Ta4 to Ta6 illustrated in FIG. 24 to FIG. 26, for each of the operation time periods (here, the operation time period number 138*n*) in the unit of terminal identification information (here, the terminal telephone number 138*f*), and stores the obtained first display control data 135*a* in the storage section 135 (see FIG. 20).

Figure 29:
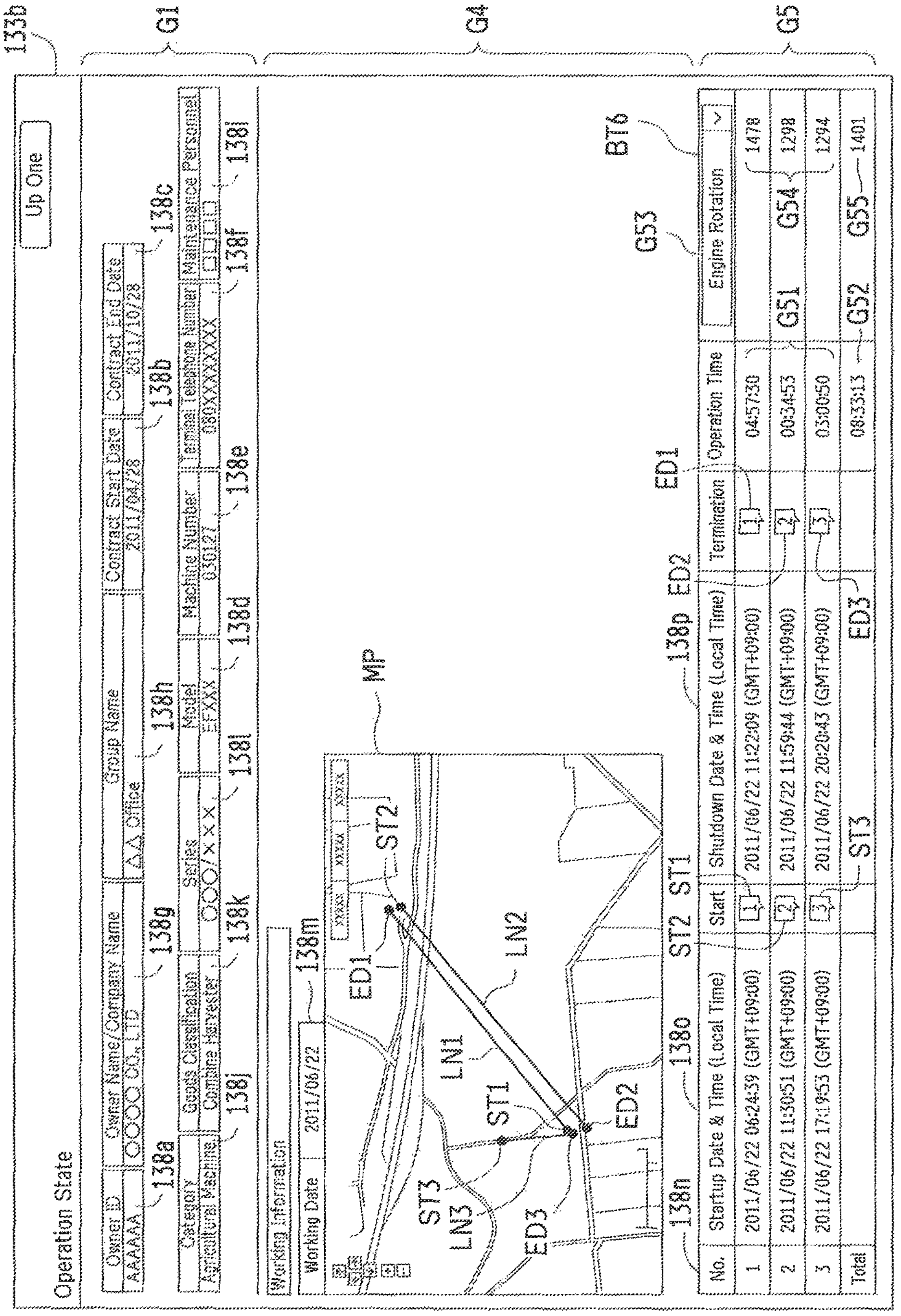
FIG. 29 is a diagram illustrating an exemplary display screen that displays operation information, and is a diagram for a second display screen.

The first display control section 136*c* creates the first display control data 135*a* used to cause the display section 133 and/or the display section 162 to display the startup date and time 138*o* and shutdown date and time 138*p* of the selected startup date 138*m*, and data for each of the operation time periods of, an operation time (see a screen area G51 illustrated in FIG. 29 later) obtained by subtracting the startup date and time 138*o* from the shutdown date and time 138*p* in each of the operation time periods (here, an operation time period number of the selected startup date 138*m*), and the accumulated operation time of the selected startup date 138*m* (see the screen area G52 illustrated in FIG. 29).

In addition, the first display control section 136*c* creates the first display control data 135*a* used to cause the display section 133 and/or the display section 162 to display a value of the detected value information 138*q* (see a screen area G53 illustrated in FIG. 29) for each of the operation time periods (here, the operation time period number of the selected startup date 138*m*) (see a screen area G54 illustrated in FIG. 29), and a value of the detected value information 138*q* (see a screen area G55 illustrated in FIG. 29) accumulated in the selected startup date 138*m*.

Figure 28:
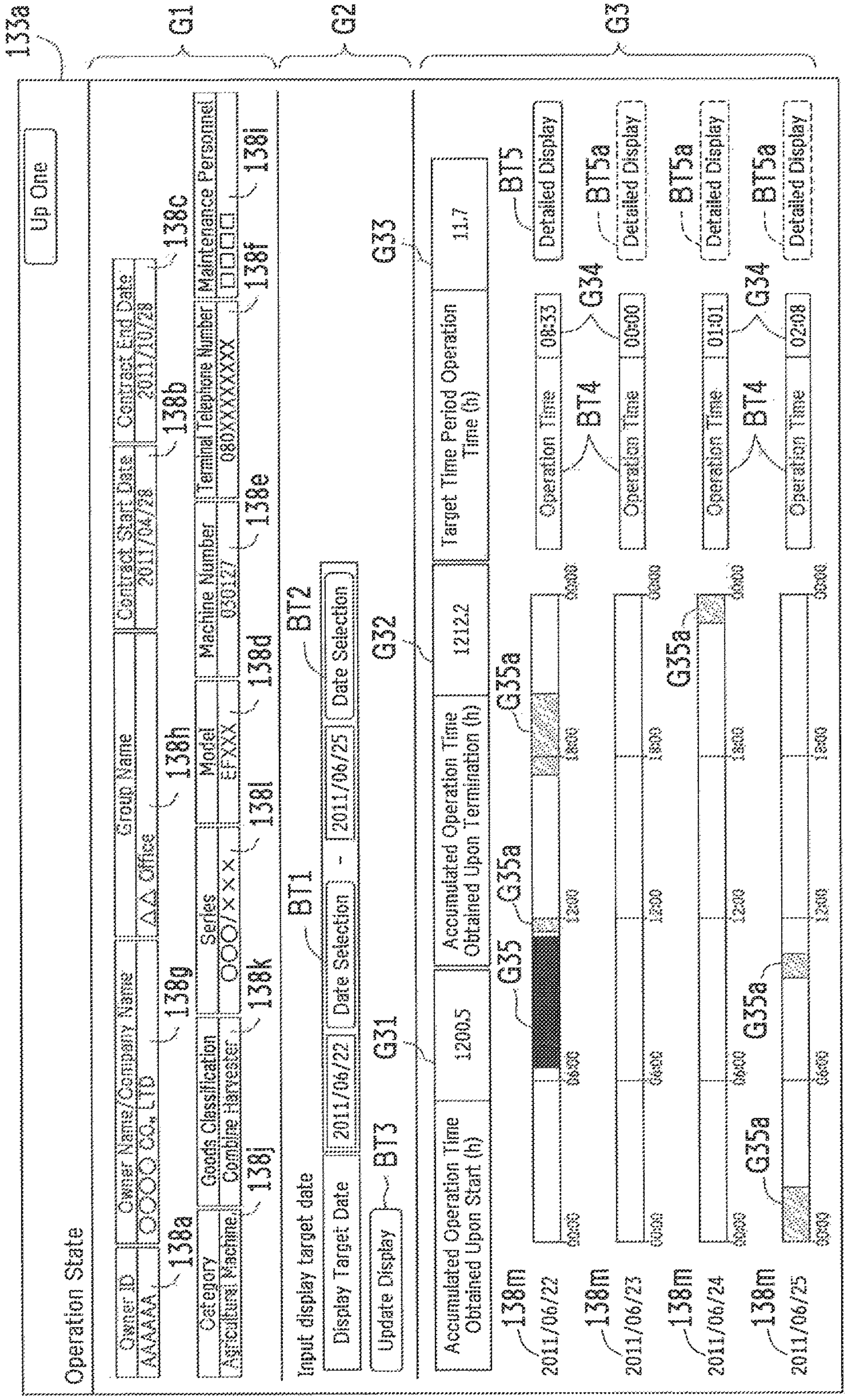
FIG. 28 is a diagram illustrating an exemplary display screen that displays operation information, and is a diagram for a first display screen.

FIG. 28 to FIG. 30 are diagrams illustrating exemplary display screens that display operation information, and are respective diagrams for first to third display screens 133*a* to 133*c*. In FIGS. 29 and 30, a first screen area G1 is the same as the first screen area G1 illustrated in FIG. 28 and the same symbol is applied to the areas. In FIGS. 29 and 30, a display location of the first screen area G1 is kept even when screen scroll is performed on the first screen area G1, and in FIG. 29, fourth and fifth screen areas G4 and G5 are displayed under the third screen area G3 on which screen scroll is performed, and in FIG. 30, the sixth screen area G6 is displayed under the third screen area G3 on which screen scroll is performed.

In the remote monitoring device 130 operating as a management server or the terminal device 160 operating as a client computer, when login is performed by a user and input of the terminal telephone number 138*f* is performed, or when input of the model 138*d* and the machine number 138*e* is performed and an operation information display selection button (not shown) is selected (specifically, clicked), the first display screen 133*a* illustrated in FIG. 28 is displayed on the display section 133 or the display section 162. Hereinafter, the terminal identification information is described as the terminal telephone number 138*f* (in the illustrated example, 080xxxxxxxx).

In the first display screen 133*a* illustrated in FIG. 28, the owner ID138*a* (in the illustrated example, AAAAAA), the contract start date 138*b* (in the illustrated example, 2011 Apr. 28), the contract end day 138*c* (in the illustrated example, 2011 Oct. 28), the model 138*d* (in the illustrated example, EFxxx), and the machine number 138*e* (in the illustrated example, 030127) corresponding to the terminal telephone number 138*f* (in the illustrated example, 080xxxxxx) are read from the first storage table Ta1 illustrated in FIG. 21, and the owner name/company name 138*g* (in the illustrated example, ○○○○ CO., LTD), the group name 138*h* (in the illustrated example, ΔΔ office), and the maintenance personnel 138*i* (in the illustrated example, □□□□) corresponding to the owner ID138*a* (in the illustrated example, AAAAAA) are read from the second storage table Ta2 illustrated in FIG. 22, and in addition, the category 138*j* (in the illustrated example, agricultural machine), the goods classification 138*k* (in the illustrated example, combine harvester), and the series name 138*l* (in the illustrated example, ○○○/xxx) corresponding to the model 138*d* (in the illustrated example, EFxxx) are read from the third storage table Ta3 illustrated in FIG. 23, and these pieces of data are displayed on the first screen area G1.

Next, when a display target date of the second screen area G2 (from the display target start date: a startup date 2011 Jun. 22 in the illustrated example, to the display target end date: a startup date 2011 Jun. 25 in the illustrated example) is selected by a user (specifically, date selection buttons BT1 and BT2 are clicked and a date is selected from a pull-down menu), and an update display button BT3 is clicked, an operation time period from the startup to shutdown in a span from the display target start date to the display target end date is displayed in the third screen area G3.

That is, the terminal telephone number 138*f* (in the illustrated example, 080xxxxxxxx) and the startup date and time 138*o* (in the illustrated example, 06:24:39) and the shutdown date and time 138*p* (in the illustrated example, 11:22:09) corresponding to the selected startup date 138*m* (in the illustrated example, 2011 Jun. 22 to 2011 Jun. 25) are read from the fourth storage table Ta4 illustrated in FIG. 24, and these pieces of data are displayed in the third screen area G3 as a bar graph represented by time in hours for each of the startup dates. In this bar graph, an operated portion is colored.

In the third screen area G3 illustrated in FIG. 28, the accumulated operation time (h) obtained upon a start (see the screen area G31) indicates an accumulated previous operation time of the agricultural machine 110 (in the illustrated example, 1200.5 (h) (decimal)) at a display target start date (in the illustrated example, the startup time 06:24:39 on the startup date 2011 Jun. 22), and the accumulated operation time (h) obtained upon a termination (see the screen area G32) indicates an accumulated previous operation time of the agricultural machine 110 (in the illustrated example, 1212.2 (h)) at a display target end date (in the illustrated example, the shutdown time 09:25:20 on the startup date 2011 Jun. 25). The target time period operation time (h) (see the screen area G33) indicates a time (in the illustrated example, 11.7 (h)) obtained by subtracting the accumulated operation time (h) obtained upon the start from the accumulated operation time (h) obtained upon the termination. An operation time (h) of each of the startup dates 138*m* (see the screen area G34, etc.) indicates an accumulated operation time (in the illustrated example, 8:33 (h)) obtained by subtracting the startup date and time 138*o* of the initial operation time period from the shutdown date and time 138*p* of the last operation time period in each of the startup dates 138*m*.

In the third screen area G3 illustrated in FIG. 28, when one of operation time buttons BT4 corresponding the screen areas G34 of the operation times (h) in the startup dates 138*m* (in the illustrated example, 2011 Jun. 22) is selected (specifically, clicked), a second display screen 133*b* illustrated in FIG. 29 is displayed.

In the second display screen 133*b* illustrated in FIG. 29, the latitude 138*w*1 (in the illustrated example, N043426133, etc.) and the longitude 138*w*2 (in the illustrated example, E141568373, etc.) of the startup location information of an operation time period (here, the operation time period numbers 1 to 3) corresponding to the startup date 138*m* selected in the third screen area G3 illustrated in FIG. 28 (in the illustrated example, 2011 Jun. 22), and the latitudes 138*x*1 (in the illustrated example, N043428387, etc.) and the longitudes 138*x*2 (in the illustrated example, E141567884, etc) of the shutdown location information are read from the seventh storage table Ta7 illustrated in FIG. 27, and straight lines "LN1", "LN2", "LN3", etc. respectively connecting start locations "ST1", "ST2", "ST3", etc. constituted by the latitudes 138*w*1 and the longitudes 138*w*2 of the startup location information, and end locations "ED1", "ED2", "ED3", etc. constituted by the latitudes 138*x*1 and the longitudes 138*x*2 of the shutdown location information are displayed on a map MP in the fourth screen area G4 for each of the operation time periods (here, the operation time period numbers 138*n*). Color-coding is performed on the straight lines "LN1", "LN2", "LN3", etc. on the map MP.

In the fifth screen area G5, the startup date and time 138*o* (in the illustrated example, 2011 Jun. 22 06:24:39 to 2011 Jun. 22 17:19:53), the shutdown date and time 138*p* (in the illustrated example, 2011 Jun. 22 11:22:09 to 2011 Jun. 22 20:20:43), and the operation time period (see the screen area G51, and in the illustrated example, 04:57:30 to 03:00:50) of the startup date 138*m* selected in the third screen area G3 illustrated in FIG. 28 are displayed for each of the operation time periods (here, the operation time period numbers 1 to 3), and the accumulated operation time (see the screen area G52, and in the illustrated example, 8:33:13) is displayed under the operation time period.

In addition, in the fifth screen area G5, a value of the detected value information 138*q* (see the screen area G53) for each of the operation time periods (here, the operation time period numbers 1 to 3) (see the screen area G54), and a value of accumulated detected value information (see the screen area G55) in the selected startup date 138*m* selected in the third screen area G3 illustrated in FIG. 28 are displayed. Specifically, in the fifth screen area G5, when a selection button BT6 of the detected value information 138*q* is clicked, and the detected value information 138*q* (see the screen area G53, and in the illustrated example, engine rotation) is selected from a pull-down menu, values of the detected value information 138*q* (in the illustrated example, average value 1478, etc.) selected in the selection button BT6 are read from the fifth storage table Ta5 illustrated in FIG. 25, these values of the detected value information 138*q* (see the screen area G54, and in the illustrated example, the average value 1478, etc.) are displayed in the fifth screen area G5 for each of the operation time period numbers 138*n*, and a value of the accumulated detected value information (see the screen area G55, in the illustrated example, average value 1401) calculated from each of the operation times and each of the pieces of detected value information is displayed.

In addition, in the third screen area G3 illustrated in FIG. 28, when one of the startup time periods (in the illustrated example, a screen area G35 of the operation time period number "1") in one of the startup dates 138*m* (in the illustrated example, 2011 Jun. 22) is selected (specifically, clicked), the third display screen 133*c* illustrated in FIG. 30 is displayed. The selected startup time period from among the startup time periods is displayed differently from the other operation time periods (specifically, display color of the selected screen area G35 is different from the color of the other screen areas G35*a*, etc.).

In the third display screen 133*c* illustrated in FIG. 30, the average values 138*r* (in the illustrated example, 1478, etc.), the maximum values 138*s* (in the illustrated example, 2671, etc.) and the minimum values 138*t* (in the illustrated example, 224, etc.) of the detected value information 138*q* of the operation time period (in the illustrated example, the operation time period number "1") selected in the screen area G35 illustrated in FIG. 28 are read from the fifth storage table Ta5 illustrated in FIG. 25, and the occurrence counts 138*v*1 (in the illustrated example, 4, etc.) and the durations 138*v*2 (in the illustrated example, 5757, etc.) of an event of the binary information 138*u* of the operation time period (in the illustrated example, the operation time period number "1") selected in the screen area G35 illustrated in FIG. 28 are read from the sixth storage table Ta6 illustrated in FIG. 26, and these pieces of data are displayed in the sixth screen area G6 with the startup date and time 138*o* (in the illustrated example, 2011 Jun. 22 06:24:39) and the shutdown date and time 138*p* (in the illustrated example, 2011 Jun. 22 11:22:09), and an operation time obtained by subtracting the startup date and time 138*o* from the shutdown date and time 138*p* of the operation time period.

Location Information Display Function

In the control section 132 illustrated in FIG. 20, the location information display control section 137 receives a startup date and time of the remote monitoring terminal device 200 from remote monitoring terminal device 200 when the remote monitoring terminal device 200 is started up, and receives, from the remote monitoring terminal device 200, a shutdown date and time of the remote monitoring terminal device 200, and location information obtained by the remote monitoring terminal device 200 for each of the predetermined intervals (for example, 30 seconds) and each of the manual operations of the predetermined manual operation section (for example, the manual operation in which the travelling handle of the agricultural machine 110 corresponds to the predetermined rotation angle or more) during an operation of the agricultural machine 110 when the remote monitoring terminal device 200 is shut down, and creates the second display control data 135*b* used to cause the display section 133 and/or the display section 162 to display the received startup date and time and shutdown date and time, and movement locus of the agricultural machine 110 based on the location information for each of the operation time periods from the startup to shutdown (here, the operation time period number 138*n*) in the unit of the remote monitoring terminal device 200 (here, the terminal telephone number 138*f*).

The second display control data 135*b* is data created by the markup language such as an HTML language used for description of a display screen of a web page. A second display control section 137*c* described later in the location information display control section 137 displays the second display control data 135*b* stored in the storage section 135 on the display section 133. In the terminal devices 160 (specifically, client computers) connected to the remote monitoring device 130 (see FIG. 1), the control section 161 of the terminal device 160 obtains the second display control data 135*b* from the remote monitoring device 130, and displays the obtained second display control data 135*b* on the display section 162 of the terminal device 160.

Specifically, the location information display control section 137 operates as a work section containing a second receiving control section 137*a*, a second storage control section 137*b*, and the second display control section 137*c*.

The second receiving control section 137*a* receives startup information of the remote monitoring terminal device 200 with the terminal identification information, from the communications section 210 of the remote monitoring terminal device 200 when the agricultural machine 110 is operated and the remote monitoring terminal device 200 is started up, and receives, from the remote monitoring terminal device, with the terminal identification information, a shutdown date and time of the remote monitoring terminal device 200 and location information obtained by the remote monitoring terminal device 200, for each of the predetermined intervals (for example, 30 seconds) and each of the manual operations of the predetermined manual operation section (for example, the manual operation in which the travelling handle of the agricultural machine 110 corresponds to the predetermined rotation angle or more) during an operation of the agricultural machine 110 when the operation of the agricultural machine 110 is terminated and the remote monitoring terminal device 200 is shut down.

FIG. 31 is a schematic data structure table showing exemplary data stored in the storage section 135, and is a diagram of an eighth storage table Ta8 provided in the storage section 135.

To the eighth storage table Ta8 illustrated in FIG. 31, the startup date and time 138*o* that is a date and time obtained upon a startup (see δ1 in FIG. 31), the latitude 138*w*1 and longitude 138*w*2 of the startup location information (see δ2 in FIG. 31), a date and time for each of the predetermined intervals and each of the manual operations of the predetermined manual operation section (each date and time) (see δ3 in FIG. 31), the latitude 138*z*1 and longitude 138*z*2 of the location information (see δ4 in FIG. 31), the shutdown date and time 138*p* that is a date and time obtained upon a shutdown (see δ5 in FIG. 31), and the latitude 138*x*1 and longitude 138*x*2 of the shutdown location information (see δ6 in FIG. 31) are registered for the terminal telephone number 138*f* and the operation time period number 138*n*. As described later, the date and time illustrated in FIG. 31 is a date and time converted from the coordinated universal time (date and time) to the local date and time. The date and time denoted by δ in FIG. 31 is a date and time when there is the manual operation of the predetermined manual operation section (for example, the manual operation in which the travelling handle of the agricultural machine 110 corresponds to the predetermined rotation angle or more).

The second storage control section 137*b* (see FIG. 20) stores, in the eighth storage table Ta8 of the storage section 135 (see FIG. 31), the startup date and time (see δ1 in FIG. 31) and the latitudes and longitudes (see δ2 in FIG. 31) of the startup location information received by the second receiving control section 137*a*, the date and time (see δ3 in FIG. 31) obtained for each of the predetermined intervals (for example, 30 seconds) and each of the manual operations of the predetermined manual operation section (for example, the manual operation in which the travelling handle of the agricultural machine 110 corresponds to the predetermined rotation angle or more) and the latitude and latitude of location information (see δ4 in FIG. 31), and the shutdown date and time (see δ5 in FIG. 31) and the latitudes and longitudes (see δ6 in FIG. 31) of the shutdown location information, for each of the operation time periods (here, the operation time period number 138*n*) in the unit of the terminal identification information of the remote monitoring terminal device 200 (here, the terminal telephone number 138*f*).

The second display control section 137*c* (see FIG. 20) creates the second display control data 135*b* used to cause the display section 133 and/or the display section 162 to display the startup date and time and the latitudes and longitudes of the startup location information, the date and time obtained for each of the predetermined intervals and each of the manual operations of the predetermined manual operation section and the latitudes and latitudes of the location information, and the shutdown date and time and the latitudes and longitudes of the shutdown location information that are stored in the eighth storage table Ta8 illustrated in FIG. 31, as a movement locus of the agricultural machine 110, for each of the operation time periods (here, the operation time period number 138*n*) in the unit of the remote monitoring terminal device (here, the terminal telephone number 138*f*), and stores the obtained second display control data 135*b* in the storage section 135 (see FIG. 20).

Figure 32:
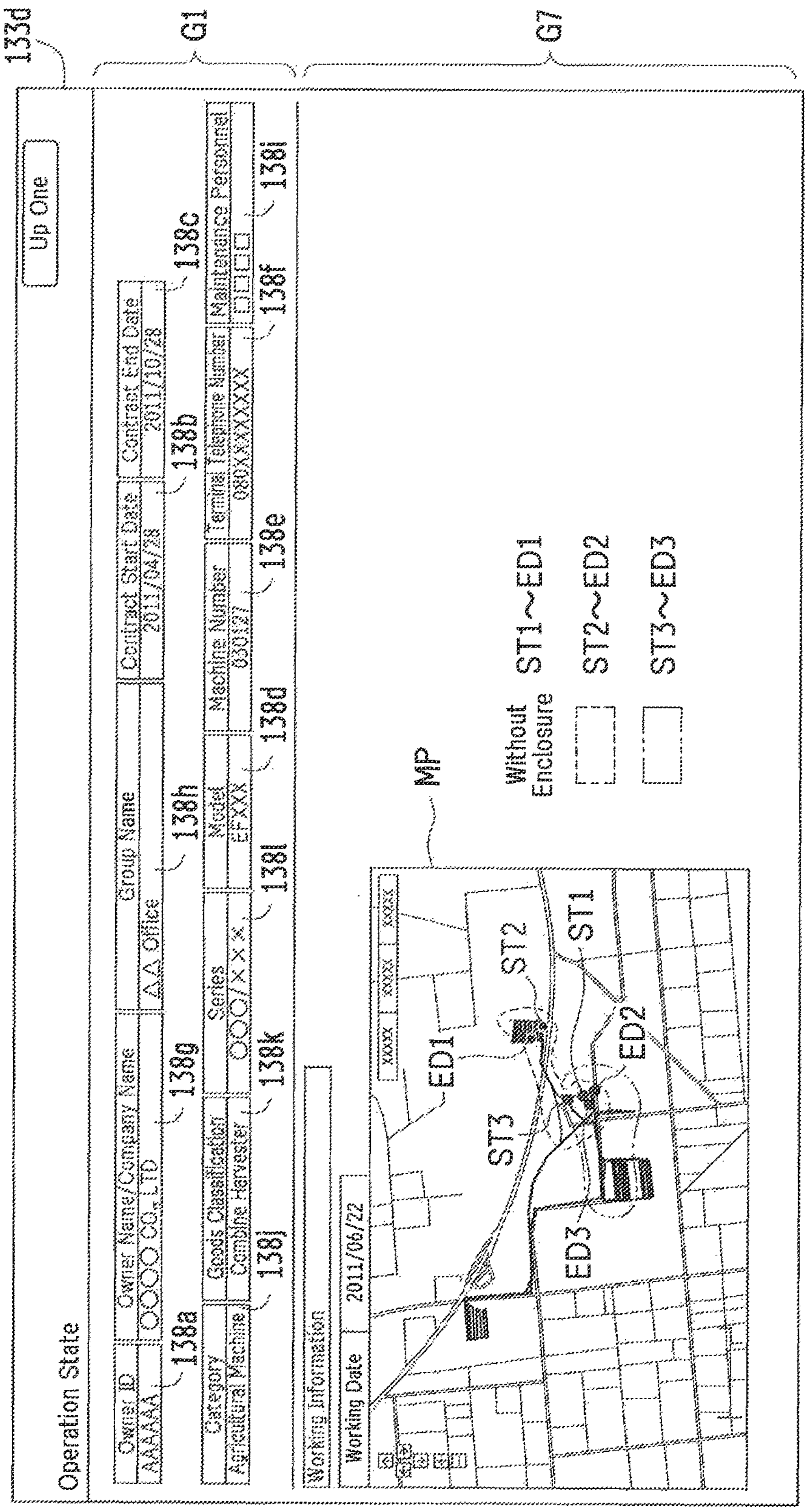
FIG. 32 is a diagram illustrating an exemplary display screen that displays a movement locus of the agricultural machine on a map, and is a diagram for a fourth display screen.

FIG. 32 is a diagram illustrating an exemplary display screen that displays a movement locus of the agricultural machine 110 on the map MAP, and is a diagram for a fourth display screen 133*d*. In FIG. 32, a first screen area G1 is the same as the first screen area G1 illustrated in FIG. 28, and the same symbol is applied to the areas. In FIG. 32, the display location of the first screen area G1 is kept even when screen scroll is performed on the first screen area G1, and the seventh screen area G7 is displayed under the third screen area G3 on which screen scroll is performed.

In the third screen area G3 in the first display screen 133*a* illustrated in FIG. 28, when a detailed display button BT5 corresponding to one of the startup dates 138*m* (in the illustrated example, 2011 Jun. 22) is selected (specifically, clicked), the fourth display screen 133*d* illustrated in FIG. 32 is displayed. The detailed display button corresponding to the selected startup date 138*m* from among the startup dates 138*m* corresponds to a selectable display (specifically, the selected detailed display button BT5 is shaded as compared with the other detailed display buttons BT5*a*).

In the fourth display screen 133*d* illustrated in FIG. 32, a latitude and longitude (see δ2, δ4, and δ6 in FIG. 31) of the startup date selected by the detailed display button BT5 illustrated in FIG. 28 (in the illustrated example, 2011 Jun. 22) are read from the eighth storage table Ta8 illustrated in FIG. 31, and these pieces of data are displayed on the map MP in the seventh screen area G7 with the startup date 138*m* (in the illustrated example, 2011 Jun. 22) for each of the operation time periods (here, the operation time period number 138*n*, etc.). On the map MP, the loci "ST1" to "ED1" (see the locus indicated without enclosure), "ST2" to "ED2" (see the locus indicated by the enclosure of the dashed line), "ST3" to "ED3" (see the locus indicated by the chain line) are represented by straight lines connecting startup locations and shutdown locations each of which are constituted by latitude and longitude in each of the operation time periods, and color-coding is performed for each of the operation time periods.

Conversion into Local Date and Time

The date and time received from the remote monitoring terminal device 200 corresponds to the coordinated universal time (date and time), so that that remote monitoring device 130 converts the date and time from the coordinated universal time (date and time) into a local date and time.

In the present embodiment, the first storage control section 136*b* (see FIG. 20) converts the startup date and time and shutdown date and time that are received from the remote monitoring terminal device 200 and correspond to the coordinated universal time, into local date and time (see FIG. 24) at a location obtained upon a startup or a location obtained upon a shutdown of the remote monitoring terminal device 200, based on the latitude 138*w*1 and longitude 138*w*2 of the startup location information or the latitude 138*x*1 and longitude 138*x*2 of the shutdown location information stored in the seventh storage table Ta7 illustrated in FIG. 27, and stores the date and time in the fourth storage table Ta4 illustrated in FIG. 24. The first display control section 136*c* creates the first display control data 135*a* used to cause the display section 133 and/or the display section 162 to display the startup date and time and shutdown date and time that are converted into the local date and time and stored in the fourth storage table Ta4.

The first storage control section 136*b* stores the startup date and time and shutdown date and time that are received from the remote monitoring terminal device 200 and correspond to the coordinated universal time, in the fourth storage table Ta4 illustrated in FIG. 24 as-is, and the first display control section 136*c* converts the startup date and time and shutdown date and time that are is stored in the fourth storage table Ta4 and correspond to the coordinated universal time, into local date and time at a location obtained upon a startup or location obtained upon a shutdown of the remote monitoring terminal device 200, based on the latitude 138*w*1 and longitude 138*w*2 of the startup location information or the latitude 138*x*1 and longitude 138*x*2 of the shutdown location information stored in the seventh storage table Ta7 illustrated in FIG. 27, and creates the first display control data 135*a* used to cause the display section 133 and/or the display section 162 to display the date and time.

In the present embodiment, the second storage control section 137*b* (see FIG. 20) converts the startup date and time, the date and time of the predetermined interval and the manual operation of the predetermined manual operation section, and the shutdown date and time that are received from the remote monitoring terminal device 200 and correspond to the coordinated universal time, into local date and time (see δ1, δ3, and δ5 in FIG. 31) at a location obtained upon a startup or location obtained upon a shutdown of the remote monitoring terminal device 200, based on the latitude and longitude of the startup location information (see δ2 in FIG. 31) or the latitude and longitude of the shutdown location information (see δ6 in FIG. 31) stored in the eighth storage table Ta8 illustrated in FIG. 31, and stores the date and time in the eighth storage table Ta8. The second display control section 137*c* (see FIG. 20) creates the second display control data 135*b* used to cause the display section 133 and/or the display section 162 to display the startup date and time, the date and time of the predetermined interval and the manual operation of the predetermined manual operation section, and the shutdown date and time that are stored in the eighth storage table Ta8 and converted into the local date and time.

The second storage control section 137*b* may store the startup date and time, the startup date and time, the date and time of the predetermined interval and the manual operation of the predetermined manual operation section, and the shutdown date and time that are received from the remote monitoring terminal device 200 and correspond the coordinated universal time, in the eighth storage table Ta8 as-is, and the second display control section 137*c* may convert the startup date and time, the date and time of the predetermined interval and the manual operation of the predetermined manual operation section, and the shutdown date and time that are stored in the eighth storage table Ta8 and correspond to the coordinated universal time, into local date and time at a location obtained upon a startup or a location obtained upon a shutdown of the remote monitoring terminal device 200, based on the latitude and longitude of the startup location information (see δ2 in FIG. 31) or the latitude and longitude of the shutdown location information (see δ4 in FIG. 31) stored in the eighth storage table Ta8, and create the second display control data 135*b* used to cause the display section 133 and/or the display section 162 to display the date and time.

The conversion from the coordinated universal time to the local date and time of the remote monitoring terminal device 200 can be performed as follows.

For example, a time zone ID for the latitude and longitude of the startup location information, or the latitude and longitude of the shutdown location information is obtained from a time zone ID storage table (not shown) in which a time zone ID is stored for a latitude and longitude in advance, and a time-zone difference d (in the illustrated example, +9 hours) from the coordinated universal time (GMT) for the obtained time zone ID is obtained from a time-zone difference storage table (not shown) in which a time-zone difference is stored for a time zone ID in advance. In addition, the time-zone difference d (in the illustrated example, +9 hours) is added to the date and time that corresponds to the coordinated universal time. The time zone ID is identification information applied for each area having a different time-zone.

In the above-described remote monitoring device 130, the display section 162 and/or the display section 133 is caused to display the startup date and time, shutdown date and time, minimum, maximum, and average values, and occurrence count and durations of the predetermined event that are stored in the fifth and sixth storage tables Ta5 and Ta6 of the storage section 135, for each of the operation time periods (here, the operation time period number 138*n*, etc.) in the unit of the remote monitoring terminal device 200 (here, the terminal telephone number 138*f*), and the display section 162 and/or the display section 133 is caused to display the startup date and time, shutdown date and time, and movement locus of the agricultural machine 110 based on the location information that are stored in the eighth storage table Ta8 of the storage section 135, for each of the operation time periods (here, the operation time period number 138*n*, etc) in the unit of the remote monitoring terminal device 200 (here, the terminal telephone number 138*f*), so that management of pieces of data of the agricultural machines 110 can be unified, and identification of an occurrence date and time in which failure occurs in the agricultural machine 110, behavior analysis for each of the operation time periods, or analysis of the transfer efficiency can be performed easily.

In the remote monitoring device 130, the date and times that are received from the remote monitoring terminal device 200, etc. and correspond to the coordinated universal time are converted into local date and time at a location obtained upon a startup or location obtained upon a shutdown of the remote monitoring terminal device 200, etc., based on the longitude and latitude of the startup location information, or the longitude and latitude of the shutdown location information stored in the storage section 135, and the display section 162 and/or the display section 133 is caused to display the date and time, so that identification of an occurrence date and time in which failure occurs in the agricultural machine 110 and behavior analysis for each of the operation time periods can be performed easily in the state according to the local time.

Other Embodiments

The remote monitoring system 100 in accordance with the present embodiment has been described as being applicable to combine harvesters, tillers, rice transplanters, or like mobile work vehicles. The remote monitoring system 100 is by no means limited to these applications and also preferably applicable to mobile work machines, such as tractors, excavators, wheel loaders, carriers, and like construction work machinery, and vessels, such as pleasure crafts and fishing boats.

The present invention is by no means limited to the embodiments described above and may be implemented in various forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

INDUSTRIAL APPLICABILITY

The present invention relates to a management server of a remote monitoring system for communication with a remote monitoring terminal device (in particular, a remote monitoring terminal device mounted on mobile work vehicles such as construction and agricultural machinery or vessels such as pleasure crafts and fishing boats), and in particular, can be applied for usage for identification of an occurrence date and time in which failure occurs in the mobile work vehicle or vessel and behavior analysis for each operation time period from the startup to shutdown.

REFERENCE SIGNS LIST

100 Remote Monitoring System
110 Agricultural Machine (Exemplary Mobile Work Vehicle)
120 Remote Monitoring Center
130 Remote Monitoring Device
131 Communications Section
132 Control Section
133 Display Section
134 Processor Section
135 Storage Section
135*a* First Display Control Data
135*b* Second Display Control Data
136 Operation Information Display Control Section
136*a* First Receiving Control Section
136*b* First Storage Control Section
136*c* First Display Control Section
137 Location Information Display Control Section
137*a* Second Receiving Control Section
137*b* Second Storage Control Section
137*c* Second Display Control Section
140 Communications Network
150 Network
160 Terminal Device
161 Control Section
162 Display Section
200 Remote Monitoring Terminal Device
210 Communications Section
220 Power Supply Control Section
231 GPS Sensor
232 Location Detection Section
233 Location Information Storage Section
240 Control Section
241 Startup Information Transmission Control Section
242 Operation Information Transmission Control Section
242*a* Data Acquisition Section
242*b* First Data Storage Control Section
242*c* First Data Computation Section
242*d* Second Data Storage Control Section
242*e* Actual Operation Information Detection Section
242*f* Second Data Computation Section
242*g* Third Data Storage Control Section
242*h* Setup Section
242*i* Manual Turn-off Operation Receiving Section
242*j* Data Transmission Section
243 Location Information Transmission Control Section
243*a* First Data Acquisition Section
243*b* Manual Turn-off Operation Receiving Section
243*c* Second Data Acquisition Section
243*d* Data Storage Control Section
243*e* Data Transmission Section
250 Processor Section
260 Storage Section
261 First Data Storage Section
262 Second Data Storage Section
263 Third Data Storage Section
264 Fourth Data Storage Section
265 Fifth Data Storage Section
BT Battery
SW Startup Switch
T Connection Terminal
TA Predetermined Interval
TB Averaging Interval
TC Sampling Interval
Ta1 First Storage Table
Ta2 Second Storage Table
Ta3 Third Storage Table
Ta4 Fourth Storage Table
Ta5 Fifth Storage Table
Ta6 Sixth Storage Table
Ta7 Seventh Storage Table
Ta8 Eighth Storage Table

The invention claimed is:

1. A remote monitoring system for monitoring a mobile work vehicle or vessel, the mobile work vehicle or vessel having a remote monitoring terminal device mounted thereon, the remote monitoring system comprising:

a management server for communicating with the remote monitoring terminal device, the management server configured to have:

a control section configured to process information; the control section having a storage section configured to store the information processed by the control section; and a communication section configured to communicate with the remote monitoring terminal device, wherein, the communication section receives:

a startup date and time of the remote monitoring terminal device from the remote monitoring terminal device when the remote monitoring terminal device is started up; and a shutdown date and time of the remote monitoring terminal device, and minimum values, maximum values, and average values of data detected by the remote monitoring terminal device during an operation of the mobile work vehicle or vessel, and occurrence counts and durations of predetermined events from the remote monitoring terminal device when the remote monitoring terminal device is shut down, wherein the control section distinguishes, by a daily report in a unit of an operation day for at least one operation time period from a startup to shutdown, the startup date and time, the shutdown date and time, the minimum values, the maximum values, the average values, and the occurrence counts and the durations of the predetermined events, which are received by the communication section, and the control section stores the received and distinguished information in the storage section in a unit of terminal identification information of the remote monitoring terminal device, wherein the control section causes a display screen of a display section to selectably display the at least one operation time period for which the mobile work vehicle or vessel is operated, wherein, when one of the at least one operation time period is selected on the display screen, the control section reads, from the storage section, the minimum values, the maximum values, the average values, and the occurrence counts and the durations of the predetermined events, all of which correspond to the selected operation time period, out of the startup date and time, the shutdown date and time, the minimum values, the maximum values, the average values, and the occurrence counts and the durations of the predetermined events, which are stored in the storage section in a unit of the terminal identification information, and causes another display screen of the display section to display together with the startup date and time and the shutdown date and time, the minimum values, the maximum values, the average values, and the occurrence counts and the durations of the predetermined events, which are read from the storage section, and the work vehicle or vessel includes at least one work section and the remote monitoring terminal device further includes a power supply control section and multiple types of connection terminals connected to output elements at which data on an operation state is supplied external to the remote monitoring terminal device to various electronic control devices to control multiple operating states of multiple work sections, wherein the at least one work section includes a startup switch SW and a battery BT, wherein the power supply control section has a timer function and is connected to the battery BT via a power supply connecting line Lbt to periodically start up a power supply, no matter whether the startup switch SW is being turned off or on, and wherein the power supply control section periodically starts up the power supply while the startup switch SW of the mobile work vehicle or vessel is being turned off, such that the power supply control section in the remote monitoring terminal device is always fed with electric power from the battery BT, and that the power supply to the control section is not turned off by the power supply control section when the startup switch SW is turned off.

2. The remote monitoring system according to claim 1, wherein the startup date and time and shutdown date and time received from the remote monitoring terminal device correspond to a coordinated universal time, wherein the communication section receives a startup location information that is location information obtained upon a startup of the remote monitoring terminal device or shutdown location information that is location information obtained upon a shutdown of the remote monitoring terminal device, and wherein the control section converts the startup date and time and shutdown date and time that are received from the remote monitoring terminal device and correspond to the coordinated universal time into local date and time at a location obtained upon the startup or location obtained upon the shutdown of the remote monitoring terminal device, based on the startup location information or the shutdown location information received by the communication section, and causes the display section to display the local date and time.

3. The remote monitoring system according to claim 2, wherein the remote monitoring terminal device further includes a GPS sensor, a location detection section, a location information storage section, wherein the GPS sensor receives radio waves from GPS satellites, and wherein the location detection section detects the location information of the mobile work vehicle or vessel in the radio waves received through the GPS sensor, and wherein the location information storage section temporarily stores therein the location information detected by the location detection section, wherein the location information contains information on the latitude, longitude, velocity, and orientation of the mobile work vehicle or vessel, herein the location information storage section is connected to the power supply control section so as to be always fed with electric power from the battery BT so as to maintain the location information even while the startup switch SW is turned off.

4. The remote monitoring system according to claim 1, wherein the control section includes an operation transmission control section, wherein the operation transmission control section further operates as a work section containing a manual turn-off operation receiving section and a data transmission section, wherein power supply to the control section is not turned off by the power supply control section when the startup switch SW is manually turned off, and wherein the power supply is turned off by the power supply control section after the data transmission section has transmitted the maximum, minimum, and average values, the occurrence counts and durations of an event, and the location information and date and time.

5. The remote monitoring system according to claim 2, wherein the control section includes an operation transmission control section, wherein the operation transmission control section further operates as a work section containing a manual turn-off operation receiving section and a data transmission section, wherein power supply to the control section is not turned off by the power supply control section when the startup switch SW is manually turned off, and wherein the power supply is turned off by the power supply control section after the data transmission section has transmitted the maximum, minimum, and average values, the occurrence counts and durations of an event, and the location information and date and time.

6. The remote monitoring system according to claim 1, wherein the remote monitoring terminal device further includes a GPS sensor, a location detection section, a location information storage section, wherein the GPS sensor receives radio waves from GPS satellites, and wherein the location detection section detects the location information of the mobile work vehicle or vessel in the radio waves received through the GPS sensor, and wherein the location information storage section temporarily stores therein the location information detected by the location detection section, wherein the location information contains information on the latitude, longitude, velocity, and orientation of the mobile work vehicle or vessel, wherein the location information storage section is connected to the power supply control section so as to be always fed with electric power from the battery BT so as to maintain the location information even while the startup switch SW is turned off.

7. The remote monitoring system according to claim 6, wherein the control section includes an operation transmission control section, wherein the operation transmission control section further operates as a work section containing a manual turn-off operation receiving section and a data transmission section, wherein power supply to the control section is not turned off by the power supply control section when the startup switch SW is manually turned off, and wherein the power supply is turned off by the power supply control section after the data transmission section has transmitted the maximum, minimum, and average values, the occurrence counts and durations of an event, and the location information and date and time.

* * * * *